United States Patent [19]

Akita et al.

[11] Patent Number: 5,521,823
[45] Date of Patent: May 28, 1996

[54] LEARNING CONTROL VEHICLE

[75] Inventors: Ryuya Akita, Hiroshima; Shin Takehara, Higashi-Hiroshima; Hiroshi Ohmura; Kiyoshi Sakamoto, both of Hatsukaichi; Mineharu Shibata, Ohtake; Shigefumi Hirabayashi, Hiroshima-ken; Seiji Miyamoto, Hiroshima, all of Japan

[73] Assignee: Mazda Motor Corporation, Hiroshima-ken, Japan

[21] Appl. No.: 357,266

[22] Filed: Dec. 13, 1994

Related U.S. Application Data

[63] Continuation of Ser. No. 937,318, Sep. 1, 1992, abandoned.

[30] Foreign Application Priority Data

| Sep. 3, 1991 | [JP] | Japan | 3-222665 |
| Sep. 3, 1991 | [JP] | Japan | 3-222666 |
| Sep. 3, 1991 | [JP] | Japan | 3-222667 |
| Sep. 3, 1991 | [JP] | Japan | 3-222668 |
| Sep. 3, 1991 | [JP] | Japan | 3-222671 |

[51] Int. Cl.⁶ .............................. B60K 41/00
[52] U.S. Cl. ................ 364/424.05; 364/425; 180/170
[58] Field of Search ............... 364/424.01, 424.05, 364/426.01, 425, 431.04, 431.06, 151, 160, 157, 449; 395/903, 905, 913; 340/901, 902, 903, 904; 180/170

[56] References Cited

U.S. PATENT DOCUMENTS

| 4,218,733 | 8/1980 | Maselli | 364/105 |
| 4,404,632 | 9/1983 | Harada et al. | 364/425 |
| 4,555,619 | 11/1985 | Anderson | 235/492 |
| 4,829,434 | 5/1989 | Karmel et al. | 364/424.1 |
| 4,911,259 | 3/1990 | Dogahara et al. | 180/170 |
| 4,930,084 | 5/1990 | Hosaka et al. | 364/426.04 |
| 5,048,100 | 9/1991 | Kuperstein | 382/36 |
| 5,058,180 | 10/1991 | Khan | 382/14 |
| 5,121,326 | 6/1992 | Moroto et al. | 364/449 |
| 5,184,303 | 2/1993 | Link | 364/449 |
| 5,189,619 | 2/1993 | Adachi et al. | 364/426.04 |

FOREIGN PATENT DOCUMENTS 3-44029  2/1991  Japan .

Primary Examiner—Kevin J. Teska
Assistant Examiner—Stephen J. Walder, Jr.
Attorney, Agent, or Firm—Keck, Mahin & Cate

[57] ABSTRACT

A vehicle having learning control includes a running condition detecting device for detecting a driving condition of the vehicle, a running characteristic control device for controlling a control gain to change a running characteristic of the vehicle and a gain control device for learning the running characteristic of the vehicle to change the control gain. The running characteristics of the vehicle can be controlled corresponding to various running conditions.

53 Claims, 31 Drawing Sheets

FIG. 4

| PROGRAM | ACS | ABS | VGR | 4WS | TRC | EGC | PSC |
|---|---|---|---|---|---|---|---|
| A1 | 4 | 5 | 5 | 5 | 1 | 1 | 1 |
| A2 | 1 | 5 | 5 | 5 | 2 | 2 | 2 |
| A3 | 2 | 4 | 4 | 4 | 3 | 3 | 3 |
| A4 | 3 | 3 | 3 | 3 | 5 | 5 | 3 |
| A5 | 4 | 1 | 1 | 1 | 5 | 3 | 5 |
| A6 | 1 | 3 | 1 | 1 | 1 | 1 | 5 |
| A7 | 5 | 2 | 2 | 2 | 5 | 5 | 5 |
| B3 | 1 | 5 | 5 | 5 | 2 | 1 | 2 |

FIG. 5

| PROGRAM | TERRAIN | ACS | ABS | VGR | 4WS | TRC | EGC | PSC |
|---|---|---|---|---|---|---|---|---|
| C1 | FREQUENT UP AND DOWN | L | H | L | L | L | — | L |
| C2 | BIG CURVE | H | L | H | H | L | H | L |
| C3 | STEEP SLOPE | — | — | — | — | H | H | — |

L ··· LOW VALUE
H ··· HIGH VALUE

FIG. 6

| PROGRAM | OPERATION | ACS | ABS | VGR | 4WS | TRC | EGC | PSC |
|---------|-----------|-----|-----|-----|-----|-----|-----|-----|
| D1 | HIGH VEHICLE SPEED | H | L | L | L | L | H | H |
| D3 | HIGH STEER SPEED | H | — | H | H | — | — | H |
| D4 | GREAT YAWRATE CHANGE SPEED | H | — | H | H | — | — | H |
| D4 | GREAT YAWRATE CHANGE | H | — | L | L | — | — | H |
| D5 | HIGH ACCELERATION SPEED | H | — | — | — | L | H | — |
| D5 | HIGH BRAKING SPEED | H | H | — | — | — | — | — |
| D5 | HIGH CLUTCH OPERATION SPEED | H | — | — | — | L | H | — |
| D6 | HIGH SHIFTLEVER OPERATION SPEED | H | — | — | — | L | H | — |
| D2 | BRAKING PLACE, ACS, ABS … H | | | | | | | |
| D7 | MANUAL SWITCH OPERATION … CONTROL GAIN COMPENSATION | | | | | | | |

FIG. 7

| PROGRAM | CIRCUMSTANCE, OPERATION | ACS | ABS | VGR | 4WS | TRC | EGC | PSC |
|---|---|---|---|---|---|---|---|---|
| E1 | NIGHT | L | H | L | L | L | L | L |
| E2 | BAD TRAFFIC | H | H | H | H | L | L | L |
| E3 | WIPER | L | H | L | L | L | L | H |
| E4 | LONG DRIVE | L | H | L | L | L | L | L |
| E5 | HIGH STEER SPEED | H | — | H | H | L | — | H |
| E5 | HIGH ACCELERATION SPEED | H | — | — | — | — | H | — |
| E5 | HIGH BRAKING SPEED | H | H | — | — | — | — | — |
| E6 | UNSTABLE RUNNING | H | H | L | L | L | L | H |
| E7 | MANUAL SWITCH OPERATION ··· CONTROL GAIN COMPENSATION | | | | | | | |

FIG. 24

| PROGRAM | TERRAIN | ATC |
|---|---|---|
| C1 | FREQUENT UP AND DOWN | — |
| C2 | BIG CURVE | H |
| C3 | STEEP SLOPE | H |

FIG. 25

| PROGRAM | OPERATION | ATC |
|---|---|---|
| D1 | HIGH VEHICLE SPEED | H |
| D3 | HIGH STEER SPEED | — |
| D4 | HIGH YAWRATE CHANGE SPEED | — |
| D4 | HIGH YAWRATE CHANGE | — |
| D5 | HIGH ACCELERATION SPEED | H |
| D5 | HIGH BRAKING SPEED | — |
| D6 | HIGH SHIFTLEVER OPERATION SPEED | H |

FIG. 26

| PROGRAM | CIRCUMSTANCE, OPERATION | ATC |
|---|---|---|
| E 1 | NIGHT | L |
| E 2 | BAD TRAFFIC | L |
| E 3 | WIPER | L |
| E 4 | LONG DRIVE | L |
| E 5 | HIGH STEER SPEED | — |
| E 5 | HIGH ACCELERATION SPEED | H |
| E 5 | HIGH BRAKING SPEED | — |
| E 6 | UNSTABLE RUNNING | L |

LEARNING CONTROL VEHICLE

This is a continuation of application Ser. No. 07/937,318, filed Sep. 1, 1992, now abandoned.

BACKGROUND OF THE INVENTION

1. Field of the Invention

The present invention relates to a learning control vehicle and, more particularly, to a control for a running characteristic of a vehicle corresponding to the running condition of the vehicle.

2. Description of the Prior Art

Generally, control gain of a vehicle running characteristic is provided so as to satisfy the driver's intention wherever the vehicle runs, whatever driving circumstances are and whatever the driver's personality is.

It has been known to provide a vehicle with a manual switch for selecting a hard mode or soft mode of active suspension system and for sporty mode or normal mode of four wheel steering system by setting a specific control gain. This enables the vehicle running characteristic to match the driver's taste.

However, the conventional vehicle with such a manual switch is not enough to satisfy the driver's desire. In view of this, a learning control vehicle has been proposed so that the driver's personality, embodied in operation, is learned for a feedback control and changes a control gain of the running characteristic of the vehicle.

Japanese Patent Publication No. 3-44029, published for opposition in 1990, discloses a learning control vehicle in which a steering ratio between the front and rear wheels is changed based on the mean value of steering angle change speed, steering angle, yawing rate, and side acceleration in a predetermined time period of the steering operation.

However, when different drivers drive the same vehicle, different running characteristics with the different drivers are learned so as to change the learning control program. As a result, the control program is not necessarily arranged to be suitable for a frequent driver such as vehicle owner and his or her family. This may cause an adverse change for the frequent driver because of the learning control.

SUMMARY OF THE INVENTION

It is therefore an object of the present invention to provide a learning control vehicle which can provide a desirable running characteristic even where different drivers drive the same vehicle.

Another object of the present invention is to provide a learning control which can provide a running stability as well as compliance with the driver's personality.

Still another object of the present invention is to provide a learning control which can provide a running characteristic which matches the driver's intention wherever the vehicle runs.

A further object of the present invention is to provide a learning control which can suppress a hunting of the control wherever the vehicle runs.

Still a further object of the present invention is to provide a learning control which can match the driver's intention taking account of the driver's habits.

The above and other objects of the present invention can be accomplished by a learning control vehicle comprising running condition detecting means for detecting a driving condition of a vehicle, running characteristic control means for controlling a control gain to change a running characteristic of the vehicle and a gain control means for learning the running characteristic of the vehicle to change the control gain. In a preferred embodiment, the learning control vehicle further comprises a driver identifying means for identifying the driver, the gain control means changing the control gain based on the identified driver's operation which is learned in a learning control program.

In another preferred embodiment, the learning control vehicle further comprises location detecting means for detecting a location of the vehicle, program memory means for storing a designated program in which a control gain is provided according to a driving area where the vehicle runs and for storing a standard program in which a control gain is changed depending on the driving area and the driver's operation, which differs from driver to driver and is learned in the standard program corresponding to each of the drivers, the gain control means changing the control gain based on one of the designated and standard programs selected based on a signal from the driver identifying means.

The location detecting means detects the location of the vehicle by means of a navigation system, which provides the location of the vehicle automatically, or a manual device, such as a manual switch, through which the driver inputs the location of the vehicle manually.

In another embodiment of the present invention, the program memory means further stores a learning control program including a terrain learning program which learns the terrain within a specific area and an operation learning program which learns the driver's operation. The gain control means selects the learning control program to change the control gain when the driver identifying means identifies a specific driver and when the location detecting means detects that the vehicle runs within a specific area. Other than that, the gain control means selects the designated program for controlling the control gain.

In another embodiment of the present invention, the gain control means selects the designated program when the driver is not the specific driver or when the vehicle does not run in the specific area. Alternatively, when the vehicle runs within the specific area even when the driver is not the specific driver, the gain control means may select the terrain learning program of the learning control program.

In a preferred embodiment of the invention, the driver identifying means identifies the driver by the accessories belonging to the driver. Further, the driver identifying means identifies the specific driver based on features of the driver's operation. In another preferred embodiment, the driver identifying means identifies the specific driver by his bodily feature. In a further embodiment, the driver identifying means is provided with a manual input means for producing an identity signal when specific information about the driver is manually provided and identifies the specific driver when the identity signal is detected.

In further embodiment, when the specific driver changes to another and vice versa, the gain control means changes the program in a predetermined time period after the change of the driver.

According to the present invention, the gain control means changes the control gain as a result of the learning of the specific driver's operation which is identified by the driver identifying means and the learning of the terrain where the vehicle runs. Therefore, the driver learning control is enacted when the specific driver, or frequent driver such as the vehicle owner or his family, drives the vehicle.

As a result, the running characteristic can be controlled by changing the control gain which is changed in accordance with the driver's operation, in particular, the specific driver's operation which is learned in a learning program so as to match the driver's personality.

As a result of the terrain learning control, the control gain is changed in accordance with the terrain which is detected by the location detecting means. The terrain learning control is carried out by selecting the standard program in which the control gain varies depending on the driver and classified area or terrain where the vehicle runs or by selecting the designated program in which a constant control gain is allotted depending on the classified area. As a result, the running characteristic can be controlled by changing the control gain in accordance with the classified area, such as city area, urban area, suburban area, mountain area, free way and the like, whoever drives the vehicle by utilizing the designated program. On top of that, the running characteristic can be controlled by changing the control gain in accordance with the driver's operation by utilizing the standard program to match the frequent driver's personality.

Further, when the vehicle runs in the specific area, such as neighborhood of the owner's house, or dealer's office in the case where the specific driver drives the vehicle, the control gain is changed in accordance with the learning control program to satisfy the specific driver. In addition, the running characteristic of the vehicle can be controlled to be suitable for the terrain of the specific area. In this case, when the vehicle is driven by a driver other than the specific driver, the control gain is changed in accordance with the terrain learning program of the learning control program so that the running characteristic of the vehicle can be controlled appropriately whoever drives within the specific area.

When the driver changes, the control gain is not changed until a predetermined time period has passed after the change of the driver so that the running stability of the vehicle can be maintained.

Further objects, features and advantages of the present invention will become apparent from the Detailed Description of Preferred Embodiments which follows when read in light of the accompanying Figures.

BRIEF DESCRIPTION OF THE DRAWINGS

FIG. 4 is a table showing various control data for the designated program A1 through A7 and standard program B3:

FIG. 5 is a table showing control data for the learning programs C1 through C3:

FIG. 6 is a table showing control data for the learning programs D1 through D7:

FIG. 7 is a table showing control data for the compensation programs E1 through E7:

FIG. 24 is a table showing control data ATC for the programs C1 through C3:

FIG. 25 is a table showing control data ATC for the programs D1 through D6:

FIG. 26 is a table showing control data ATC for the programs E1 through E6:

DETAILED DESCRIPTION OF THE PREFERRED EMBODIMENTS

Figure 1:
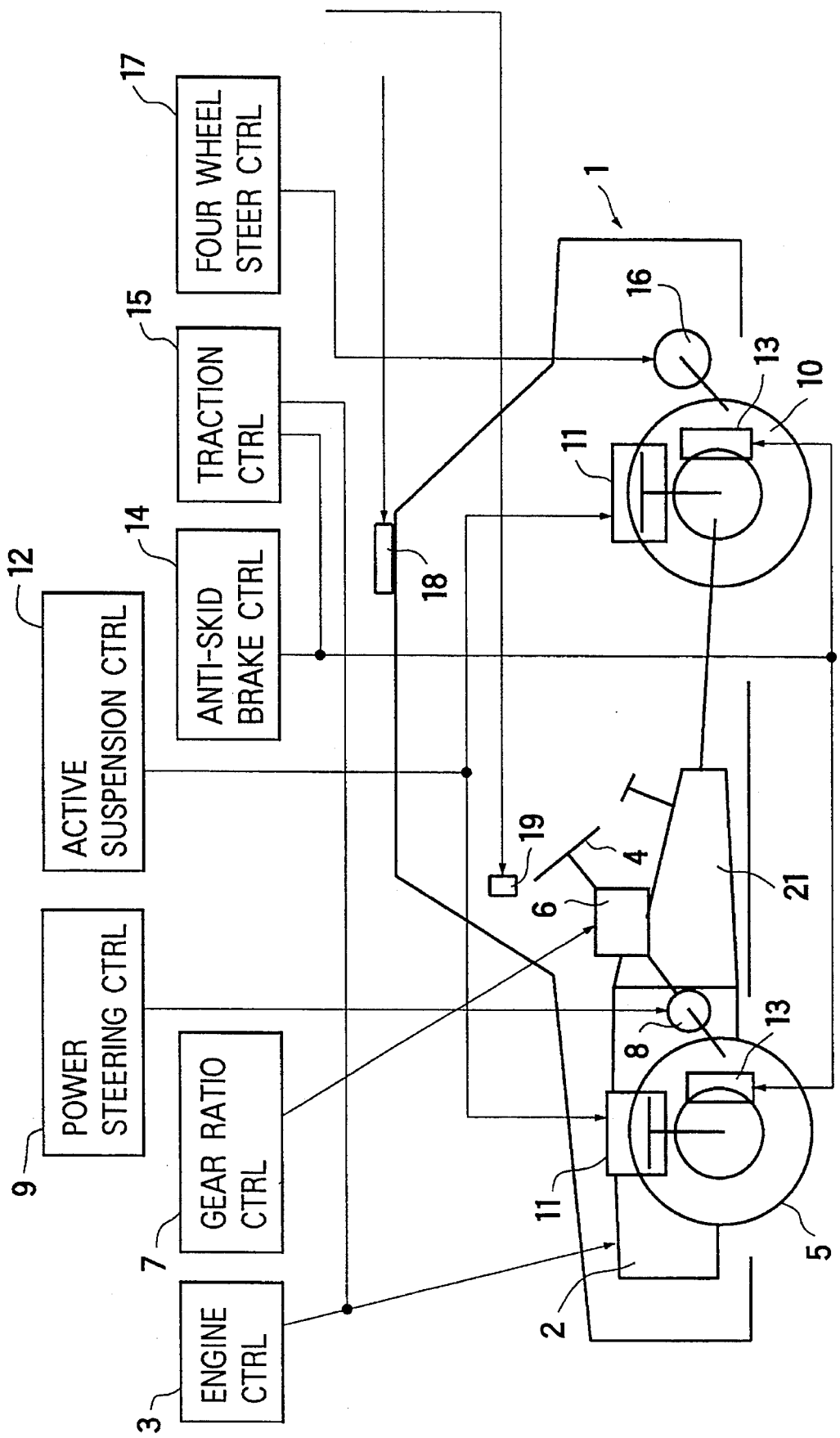
FIG. 1 is a schematic block diagram of the learning control system of a vehicle in accordance with the present invention.

Referring to FIG. 1, a learning control vehicle 1 is provided with engine 2, engine control device 3 for controlling the amount of intake gas, ignition timing, and fuel injection, gear ratio change device 6 for changing steering angle ratio of front wheels 5 to steering wheel 4, gear ratio control device 7 for controlling the gear ratio change device 6, power steering control device 9 for controlling power steering device 8, active suspension control device 12 for controlling active suspension 11 for front wheels 5 and rear wheels 10, anti-skid brake control device 14 for controlling brake system 13 for front and rear wheels 5, 10, traction control device 15 for controlling the engine 2 and the brake system 13 and four wheel steering control device 17 for controlling rear wheel steering device 16 which steers the rear wheels 10. In the drawing, numeral 18 designates location detecting sensor which receives a signal, such as magnetism from a the earth, and other signals from satellite, a sign post (not shown) and the like to detect the location of the vehicle 1. Numeral 19 designates a display device for showing the location of the vehicle running on a map and the like.

Figure 2:
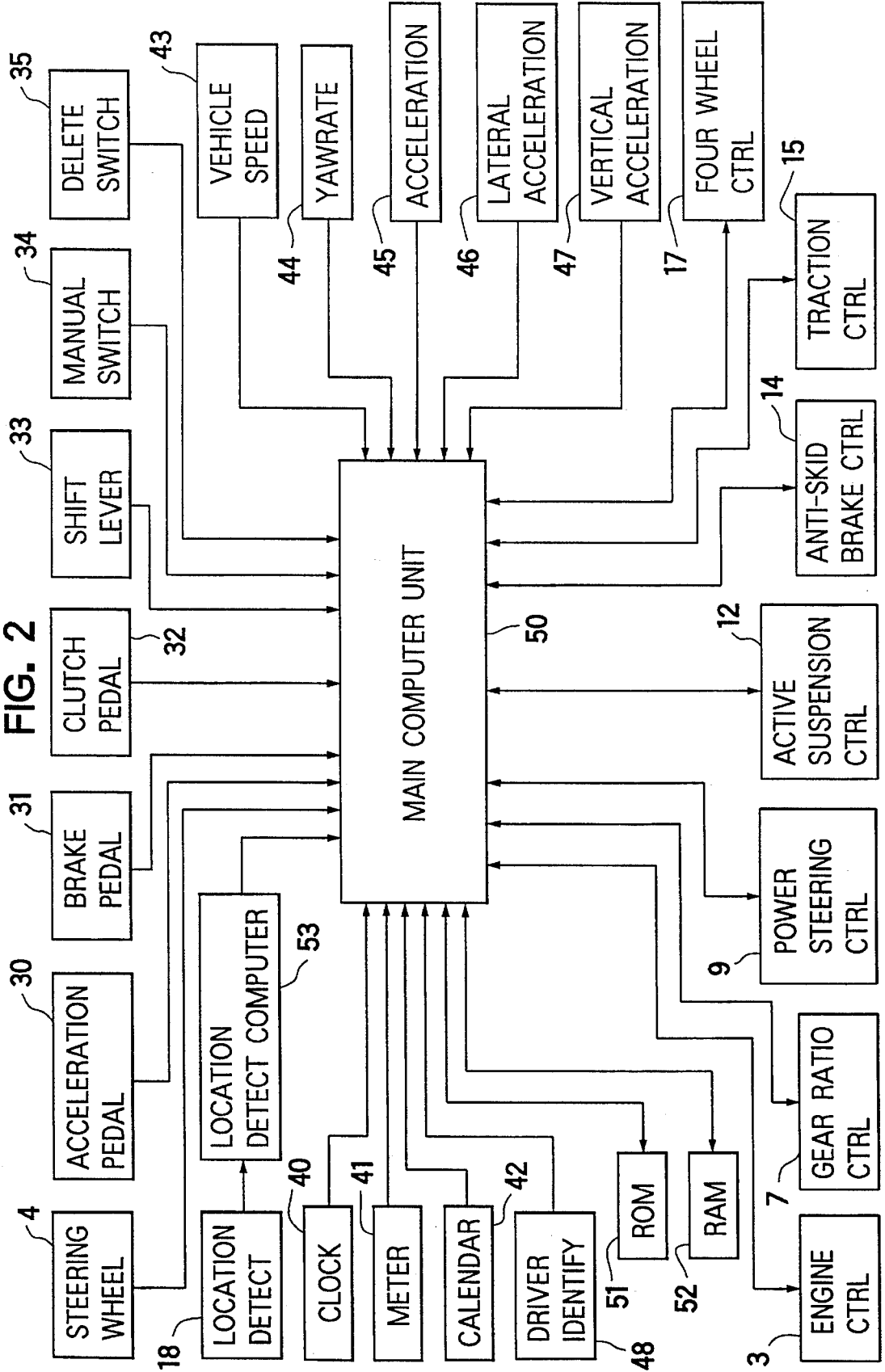
FIG. 2 is a block diagram of an operation, detection, and control system of the vehicle.

Referring to FIG. 2, the vehicle 1 is operably provided with the steering wheel 4, acceleration pedal 30, brake pedal 31, clutch pedal 32, shift lever 33, manual switch 34 for manually changing the control gain and delete switch 35 for deleting program to be rewritten, which is stored in RAM 52. When the vehicle 1 is sold to another person, the control program is necessary to be rewritten because the driver changes and the learned information of the driver is no longer useful. Under these circumstances, the program can be deleted by the delete switch 35 so as to build new information of the driver. Normally, the delete switch is accessible only by limited persons such as, for instance a dealer, a car maker and the like.

The vehicle 1 is also provided for detection with location detecting sensor 18, clock 40, distance meter 41 for detecting running distance of the vehicle 1, calendar 42, vehicle speed sensor 43 for detecting the vehicle speed V, yaw rate sensor 44 for detecting yawing rate of the vehicle 1, acceleration, sensor 45 for detecting vehicle acceleration, lateral acceleration sensor 46 for detecting side acceleration GL of the vehicle 1, vertical acceleration sensor 47 for detecting vertical acceleration GV of the vehicle 1, and driver identifying device 48 for identifying the driver by reading out data of the driver from IC card. Alternatively, the driver identifying device 48 identifies the driver by means of articles of the driver, such as, a key, a license, a watch and the like. The engine control device 3, gear ratio control device 7, power steering control device 9, active suspension control device 12, anti-skid brake control device 14, traction control device 51 and four wheel steer control device 17 are provided with timers respectively.

Further, control system of the vehicle 1 is provided with main computer unit 50, a ROM which stores a predetermined program, a RAM 52 which stores a program which can be rewritten, computer unit 53 for detecting the location of the vehicle 1 based on the signal from the location detecting sensor 18, engine control device 3, gear ratio control device 7, power steering control device 9, active suspension control device 12, anti-skid brake control device 14, traction control device 15 and four wheel steer control device 17.

The main computer unit 50 is accessible to programs stored in the ROM 51 and RAM 52 and receives signals from the steering wheel 4, acceleration pedal 30, brake pedal 31, clutch pedal 32, shift lever 33, manual switch 34, delete switch 35, location detecting sensor 18, clock 40, meter 41, calendar 42, vehicle speed sensor 43, yaw rate sensor 44, acceleration sensor 45, lateral acceleration sensor 46, vertical acceleration sensor 47 and driver identifying sensor 48 and produces signals to engine control device 3, gear ratio control device 7, power steering control device 9, active suspension control device 12, anti-skid brake control device 14, traction control device 15 and four wheel steer control device 17.

Figure 3:
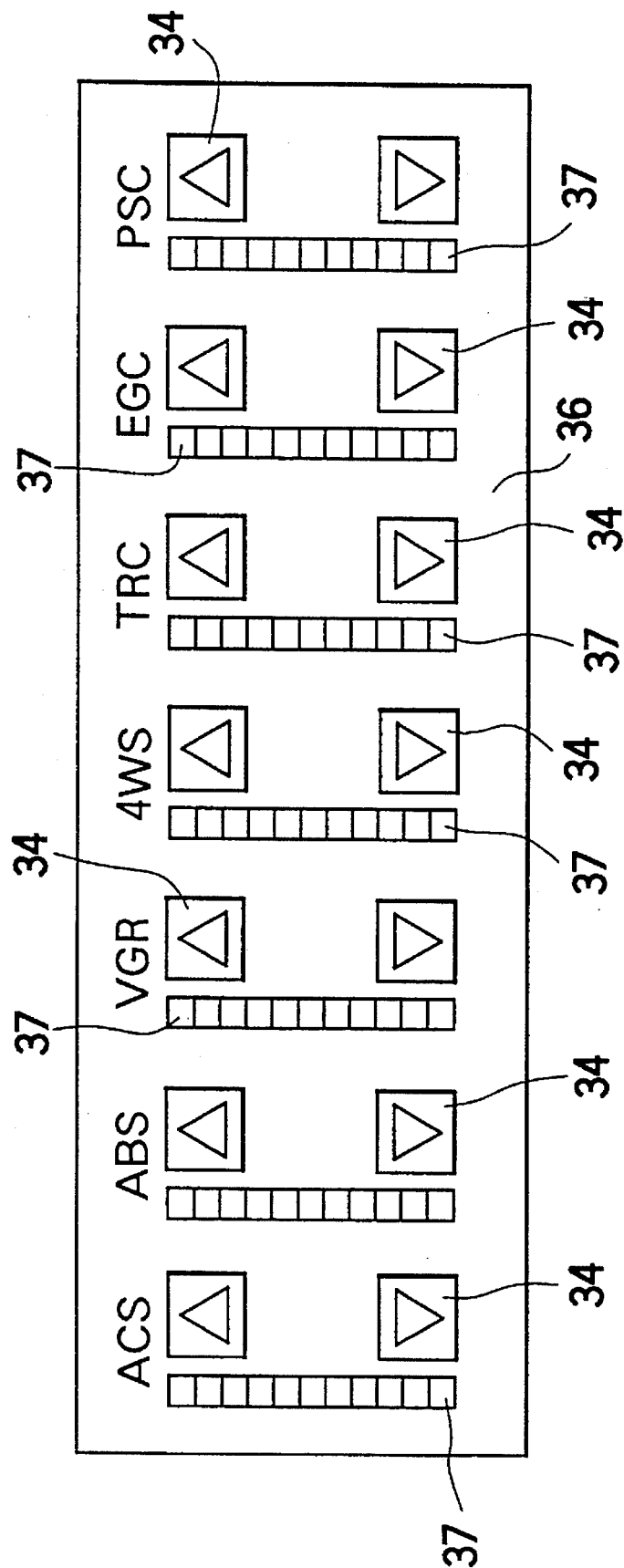
FIG. 3 is a front view of an instrument panel with a manual switch.

A control gain for the engine control device 3, gear ratio control device 7, power steering control device 9, active suspension control device 12, anti-skid control device 14, traction control device 15 and four wheel steer control device can be changed by means of the operation of the manual switch 34. FIG. 3 shows an instrument panel 36 on which the manual switch is disposed wherein numeral 37 designates an indicator.

ROM 51 stores a designated program A1 for city area drive, designated program A2 for urban area drive, designated program A3 for suburban area drive, designated program A4 for mountain area drive, designated program A5 for free way drive, designated program A6 for a road of which frictional coefficient μ is not greater than a predetermined value and designated program A7 which is used when the lateral acceleration of the vehicle 1 is greater than a predetermined value such as 0.5G so as to improve the running stability.

RAM 52 stores the designated programs A1 through A2 when the vehicle is driven for the first time or after the delete switch is operated. As the vehicle 1 is driven by a specific driver, such as the vehicle owner or a member of his family, the designated programs A1 through A5 stored in RAM 52 are compensated for the specific driver to be standard programs B1 through B5 by virtue of compensation programs E5 through E7.

The designated programs A1 through A5 are used when the vehicle 1 is driven by a driver other than the specific driver or when the specific driver is not identified by the driver identifying device 48 through the IC card and the like. One of the designated programs A1 through A5 is selected as a result of the detection of classified area where the vehicle 1 runs. The area is judged by the main computer 50 based on navigation signal from the computer unit 53 which receives the signal from the location detecting device 18. It will be understood that the location detecting device 18 can be either a navigation system which provides the location of the vehicle automatically or a manual device such as a manual switch through which the driver inputs the location of the vehicle manually. Meanwhile, where the vehicle 1 is driven for the first time, or just after the delete switch 35 is operated, the designated programs will be used even when the specific driver drives the vehicle 1 since RAM 52 stores virtually the designated programs A1 through A5.

The designated programs A6 and A7 are used prior to the standard programs B1 through B5 when the vehicle 1 runs on a road of which frictional coefficient μ is not greater than the predetermined value and when the lateral acceleration GL is greater than the predetermined value such as 0.5G so that the running stability can be obtained.

The designated programs A1 through A5 stored in ROM 51 are duplicated and stored in RAM 52 as an initial form of the standard programs B1 through B5 when the vehicle 1 is driven for the first time or just after the delete switch 35 is operated. Then, the designated programs A1 through A5 stored in RAM 52 are compensated as the vehicle 1 is driven and changed to learned standard programs B1 through B5. The programs B1, B2, B3, B4 and B5 are provided for city area drive, urban area drive, suburban drive, mountain area drive, and free way drive respectively. When the specific driver drives the vehicle 1, one of the programs B1 through B5 is selected and used based on the signal from the location detecting device 18 which is processed in the computer units 50, 53 for detecting the terrain where the vehicle 1 is running.

RAM 52 stores learning programs C1 through C3 and D1 through D7 which are used prior to the standard programs B1 through B5 when the vehicle 1 runs within a specific area, for example, an area within 20 km from the owner driver's house, or from a dealer's office. The specific area is detected by utilizing the location detecting device 18 as well.

The learning programs C1 through C3 learn the terrains of roads in the specific area for every unit zone. The program C1 learns a road surface condition with regard to the vertical or up and down movement and vibration of the vehicle or pitching of the vehicle in the specific area for every unit zone based on the vertical acceleration GV of the vehicle 1 detected by the vertical acceleration signal 47. The programs C2 and C3 learn a curve and slope of the roads for every unit zone respectively.

The learning programs D1 through D7 learn the driver's operation for the unit zone in the specific area with regard to the day of the week and a predetermined hourly period, such as every 3 hours of the day. The programs D1 learns vehicle speed V for the unit zone of the specific area, the day of the week and the predetermined hourly period of the day. The program D2 learns the location where the braking operation is made. The program D3 learns the driver's operation for the steering wheel 4. The programs D4 and D5 learn a mean yaw rate Y for the unit zone of the road, the driver's operation for the acceleration pedal 30, brake pedal 31 and clutch pedal 32 respectively. The programs D6 and D7 learn the driver's operation for the shift lever 33 and the location where the manual switch 34 is operated respectively.

The unit zone is provided as for example 1 km of the road length wherein the adjacent unit zones have an overlapped road length, for example 100 m. Alternatively, the unit zone may be provided for a distance of 10 minute running of the vehicle 1 wherein adjacent unit zones have an overlapped portion of 1 minute running of the vehicle 1.

When the vehicle 1 has run a predetermined number of times, such as 10 times, 50 times on the same unit zone of the same road on the same day of the week in the same hourly period, the mean values about the terrain of the road are calculated so that the programs C1 through C3 are initially formed and stored in RAM 52. Likewise, the programs D1, D3 through D6 are initially formed and stored in RAM 52. When the vehicle has run the predetermined times in the same manner as aforementioned, mean values of the driver's operation for the brake pedal 31 and manual switch 34 where the operation is made at the same place are calculated to initially form the programs D2 and D7 which are stored in RAM 52. In this case, if the brake pedal 31 is operated within 5 m distance or if the manual switch 34 is operated within 10 m distance, such operations are deemed to occur at the same place.

There are provided compensation programs E1 through E7 for compensating the programs B1 through B5, C1 through C3 and D1 through D7.

The program E1 compensates uniformly the standard programs B1 through B5 when the main computer 50 detects night time based on a signal from the clock 40. The program E2 compensates uniformly the programs B1 through B5, C1 through C3 and D1 through D7 when the computer unit 50 detects a bad traffic condition. The program E3 compensates uniformly the programs B1 through B5, C1 through C3 and D1 through D7 when the computer unit 50 detects a weather condition in which it is raining and snowing based on a signal from a wiper and the like. The program E4 compensates uniformly the programs B1 through B5, C1 through C3 and D1 through D7 when the computer unit 50 detects that a continuous driving time exceeds a predetermined period. The compensation program E1 through E4 are formed based on experimental or theoretical data and stored in RAM 52.

The compensation program E5 compensates the standard programs B1 through B5 based on the features of the specific driver's operation on the steering wheel 4, acceleration pedal 30 and brake pedal 31 as a result of the operation speed of steering wheel 4, acceleration pedal 30 and brake pedal 31 which are calculated by the main computer 30. When the main computer 50 detects instability of the vehicle running, the program E6 compensates uniformly the programs B1 through B5, C1 through C3 and D1 through D7. The program E7 compensates the programs B1 through B5 in accordance with the operation of the manual switch 34.

The program E6 is formed experimentally and/or theoretically and stored in RAM 52. In forming the program E5, mean values of the operation speed of the steering wheel 4, acceleration speed 30 and brake pedal 31 are calculated for the same area, namely, city area, urban area, suburban area, mountain area and free way area and stored in RAM 52 when the vehicle has run a predetermined number of times, such as 100 times, and 200 times within the same area. The program E7 is initially formed in accordance with a mean value of operation of the manual valve 34 when the vehicle 1 has run the predetermined number of times in the same area.

It will be understood that the programs E1, E3 and E7 are not used for compensating the programs C1 through C3 and D1 through D7 but for compensating the programs B1 through B5. There is no need for compensation by the programs E1, E5 and E7 on the programs C1 through C3 and D1 through D7 because they are formed already taking account of the features of the driver's operation for every unit zone on the same day of the week in the same hourly period of the day.

The learning programs C1 through C3, D1 through D7 and compensation programs E5 through E7 store the detected data. For example, the program C1 stores the vertical acceleration GV. The program C2 stores the lateral acceleration GL.

In FIG. 4, there are shown ratios of control data stored in the designated programs A1 through A7 which is stored in ROM 51 and ratios of the control data stored in the standard program B3 which is stored in RAM52.

In FIG. 4, ACS, ABS, VGR, 4WS, TRC, EGC and PSC are ratios of the control data between the programs A1 through A7 and B3 for the active suspension control device 12, anti-skid brake control device 14, gear ratio control device 7, four wheel steer control device 17, traction control device 15, engine control device 3 and power steering control device 9 respectively.

These ratios of the data are processed taking account of coefficients for the respective control devices so that actual control data can be obtained. If ACS takes a value of 1, the softest suspension characteristic can be obtained. Conversely, an ACS value of 5 provides the hardest one.

An ABS value of 1 provides the weakest control for the anti-skid control system in which the anti-skid control is relatively suppressed. Whereas, an ABS value of 5 provides the strongest control in which the anti-skid control is relatively facilitated. A VGR value of 1 provides the greatest gear ratio while a value of 5 provides the smallest gear ratio. A 4WS value of 1 provides the strongest tendency that the rear wheels are steered in the same direction as the front wheels. A 4WS value of 5 provides the strongest tendency that the rear wheels are steered in the opposite direction to the front wheels. A TRC value of 1 provides the weakest traction control for suppressing a slip of the wheels while a value of 5 provides the strongest traction control. An EGC value of 1 provides an engine control for the best fuel consumption efficiency. An EGC value of 5 provides an engine control for most powerful output. A PSC value of 1 provides the strongest assistance for the steering operation while the value of 5 provides the weakest assistance for the operation.

These control data for controlling the running characteristics of the vehicle 1 are determined so as to satisfy the driver as much as possible.

In the designated program A4 for the city area drive, the ACS is set at a value of 4 which provides a relatively hard suspension characteristic. In the city area drive, the start and stop operations are frequently repeated because of a bad traffic and numerous traffic lights. Thus, the harder characteristic can improve a riding comfort because a squat and dive of the vehicle 1 resulting from the start and stop operations can be suppressed as low as possible. On the other hand, in the designated program A2 for urban area drive, the ACS is set at the smallest value of 1 to provide the softest suspension characteristic. In the urban area, the vehicle speed is increased in comparison with the city area. But, this increase of the vehicle speed is not remarkable and the running stability can be maintained. In view of this, the ACS is set at the smallest degree so as to pursue the riding comfort. In the designated program A3 for the suburban area drive, the ACS is set at a value 2 because the vehicle speed is remarkably increased and therefore the running stability is reduced. In the designated programs A4 and A5, the value is further increased to be values of 3 and 4 respectively to make the suspension characteristic harder so as to improve the running stability taking account of the remarkable increase of the vehicle speed. In the designated program A6 for the low friction load drive, the ACS is set at the smallest value of 1 to provide the softest suspension characteristic. In the designated program A7 which is used when the lateral acceleration of the vehicle is greater than a predetermined value such as 0.5, the ACS is set at the largest value of 5 to provide the hardest suspension characteristic to improve the running stability.

ACS value is compensated for the standard program B3 as shown when the driver makes a mild operation.

FIG. 5 shows how to determine the control data for the programs C1 through C3 in accordance with the terrain within the specific area. FIG. 6 shows how to determine the control data for the programs D1, D3 through D6 in accordance with the driver's operation for every unit zone in the specific area, and how to determine the control data for the programs D2 and D7 in accordance with the driver's operation at each of the places of the unit zone.

FIG. 7 shows how to compensate the control data for the programs B1 through B5, C1 through C3 and D1 through D7 by utilizing the compensation program E1 through E7.

Compensation based on the driver's operation is made in light of a map stored in the computer 50 in FIGS. 5, 6 and 7. In FIGS. 5 and 6, "large" means that the control data is compensated by a relatively large extent. "Small" means that the control data is compensated by a relatively small extent.

Figure 8:
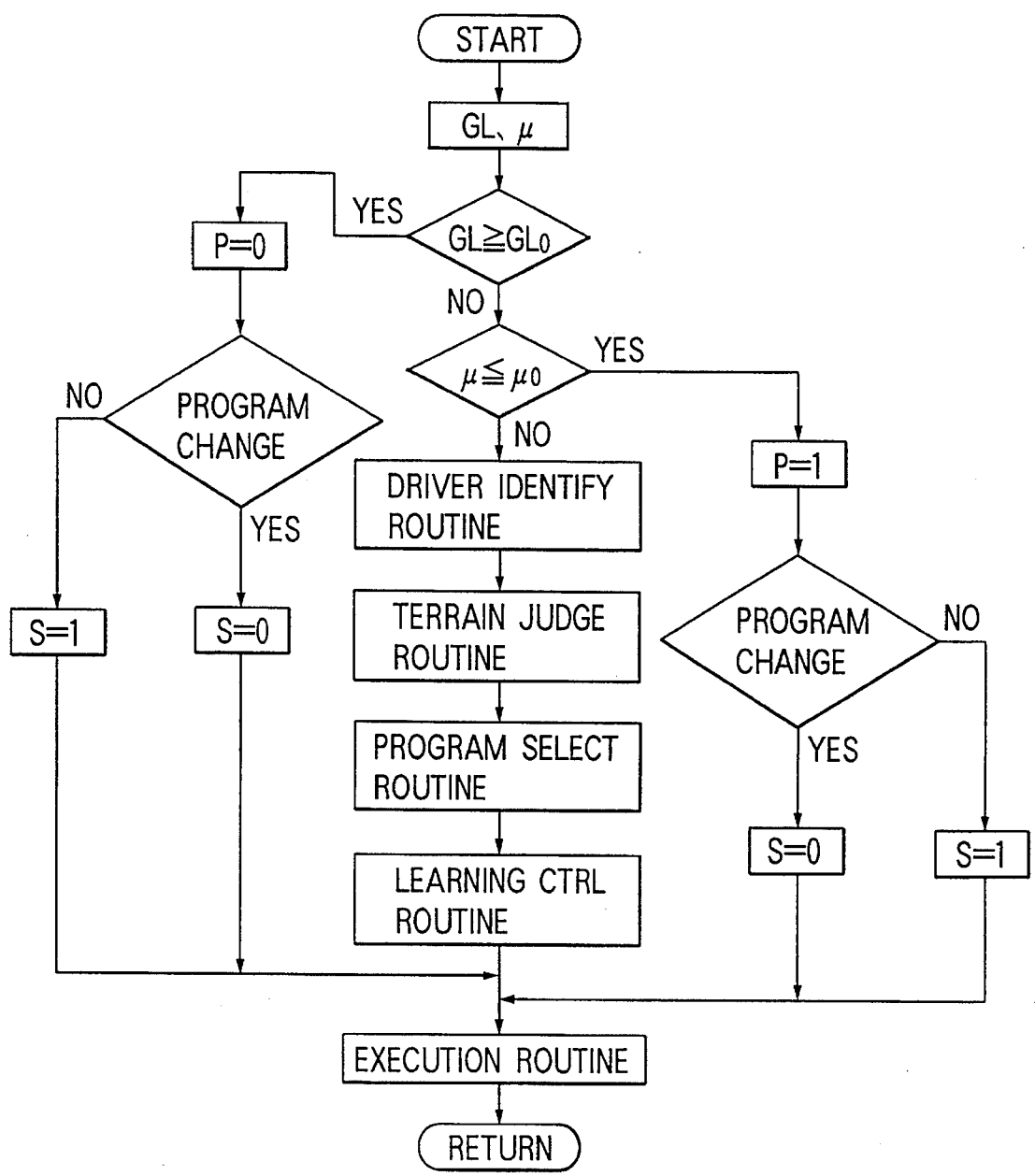
FIG. 8 is a flow chart of a basic routine of the learning control for the control gain for controlling the running characteristics of the vehicle.

In FIG. 8, there is shown a flow chart of basic routine in the main computer 50.

The main computer 50 receives the lateral acceleration GL from the lateral acceleration sensor 46, a presumed value of friction coefficient $\mu$ of the road surface.

The main computer 50 judges whether or not the absolute value of the lateral acceleration GL is greater than a predetermined value, such as 0.5G. If the judgment is Yes or if the lateral acceleration GL is greater than the predetermined value, it is considered that the control should be carried out in accordance with the program A7 in ROM 51 so as to improve the running stability. In this case, the computer 50 sets flag P at a value of 0 and judges whether or not a program to be used was changed in the preceding cycle. The flag P is provided for judging whether or not the vehicle 1 is running on a low friction road. If the judgment is Yes or if the program to be used has been changed, the computer 50 sets flag S at a value of 0. If not, the computer 50 sets flag S at a value of 1. The flag S is provided for judging whether or not the program to be used has been changed between the preceding cycle and the current cycle.

If the lateral acceleration is not greater than the predetermined value, the computer 50 judges whether or not the frictional coefficient $\mu$ is not greater than a predetermined value $\mu_0$. If the judgment is Yes or if the frictional coefficient $\mu$ is not greater than the predetermined value, it is considered that the vehicle 1 is running on a low friction road and that the control should be made taking account of the running stability in accordance with the program A6. In this case, the computer 50 sets the flag P at a value 1. Then, the computer 50 judges whether or not the program to be used was changed in the preceding cycle. If the judgment is Yes or if the program to be used has been changed, the computer 50 sets the flag S at a value 0. If not, the flag S is set at a value 1.

If the frictional coefficient $\mu$ is greater than the predetermined value, the computer 50 executes a driver identifying subroutine to judge whether or not the driver is the specific driver, such as the owner driver or a member of his family and thus whether or not the control under the programs A1 through A5 is made.

Figure 9:
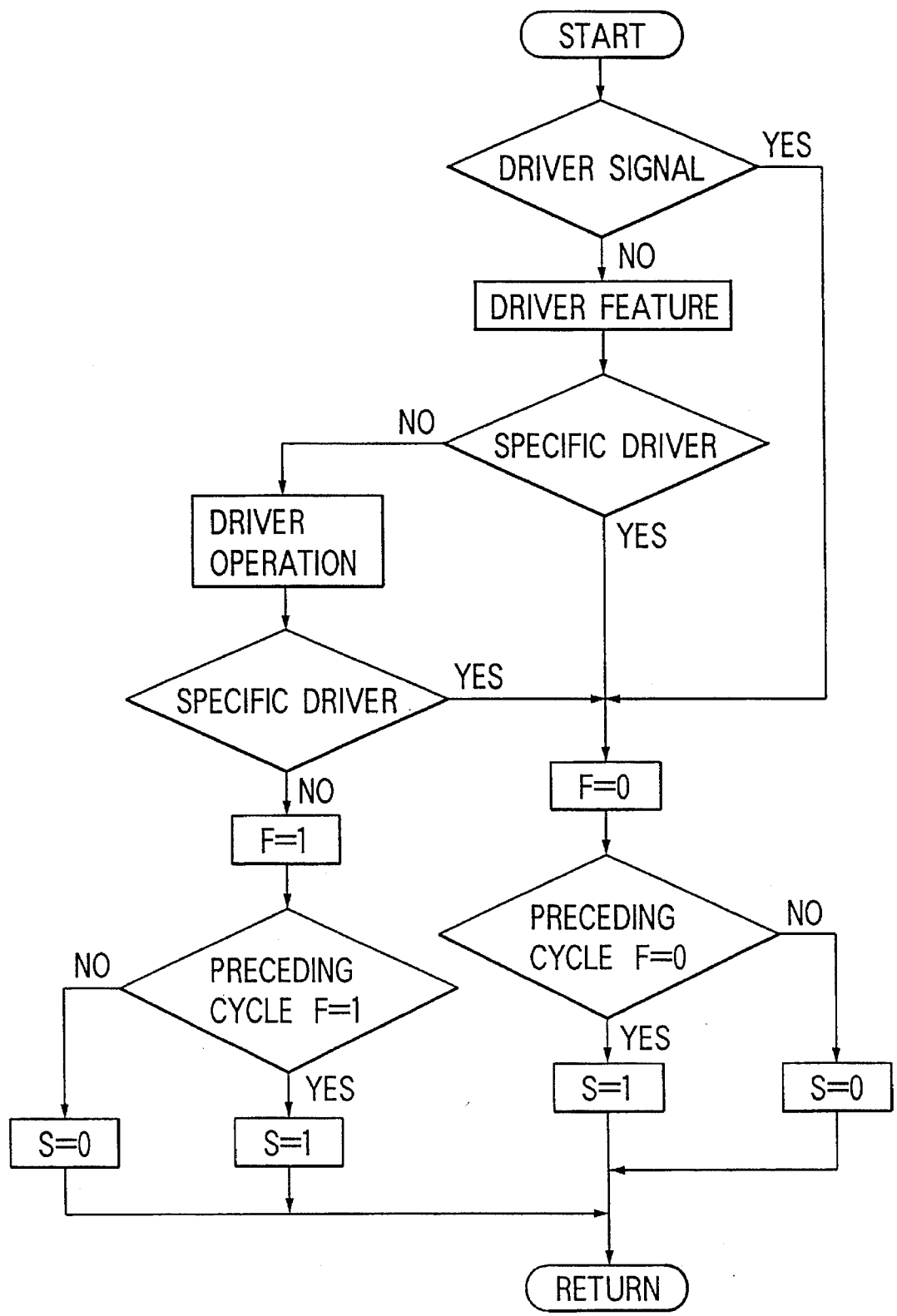
FIG. 9 is a flow chart of a driver judging subroutine.

Namely, as shown in FIG. 9, the computer 50 judges the specific driver based on a signal from the driver identifying device 48. The driver identifying device 48 produces a driver signal indicating the specific driver when an article belonging to the driver such as IC card, his key, license, or clock with transmitter is detected. This driver signal indicating the specific driver is introduced into the computer 50. When the driver signal is introduced, the main computer 50 sets flag F at a value of 0. The flag F is provided for judging whether or not the vehicle is driven by the specific driver or not. Then, the computer 50 judges whether or not the flag F was a value of 0 at the preceding cycle. If this judgment is Yes or if the flag F was not zero in the preceding cycle, the computer 50 sets the flag S at zero. If the flag F was zero in the preceding cycle, the flag S is set at a value of 1.

On the other hand, if the driver signal is not produced, the computer 50 judges the specific driver based on the driver's body shape, weight, voice, seat position, looks by means of a weight detecting device, image processing device, voice recorder and sheet position detector. In this case, the computer judges the specific driver when one or more factors is or are identical with the data stored in RAM 52. If the computer 50 judges the specific driver, the computer 50 sets the flag F at a value of 0. Next, the computer 50 judges whether or not the flag F was zero in the preceding cycle. If the flag F was not zero in the preceding cycle, the computer 50 sets the flag S at a value of 0. If the flag F was zero in the preceding cycle as well as the present cycle, the flag S is set at a value of 1.

On the other hand, if the computer 50 does not recognize the specific driver, the computer 50 monitors the operation speed of the steering wheel 4, acceleration pedal 30, brake pedal 31 and clutch pedal 32 for a predetermined time period. The computer 50 compares the values of the operation speeds monitored for the predetermined period with the corresponding values stored in RAM 52 as the values of the specific driver. If the difference between the monitored values and the stored values is within a predetermined scope, the computer determines that the driver is the specific driver.

If the difference is greater than the predetermined value, the computer 50 judges that the driver is not the specific driver. In this case, the computer 50 sets the flag F at a value of 1. Then, the computer 50 judges whether or not the flag F was a value of 1 in the preceding cycle. If the flag F was not a value of 1 in the preceding cycle, the computer 50 sets the flag S at a value of 0. If the flag F was 1 in the preceding cycle as well as the present cycle, the computer 50 sets the flag S at a value of 1.

Figure 10:
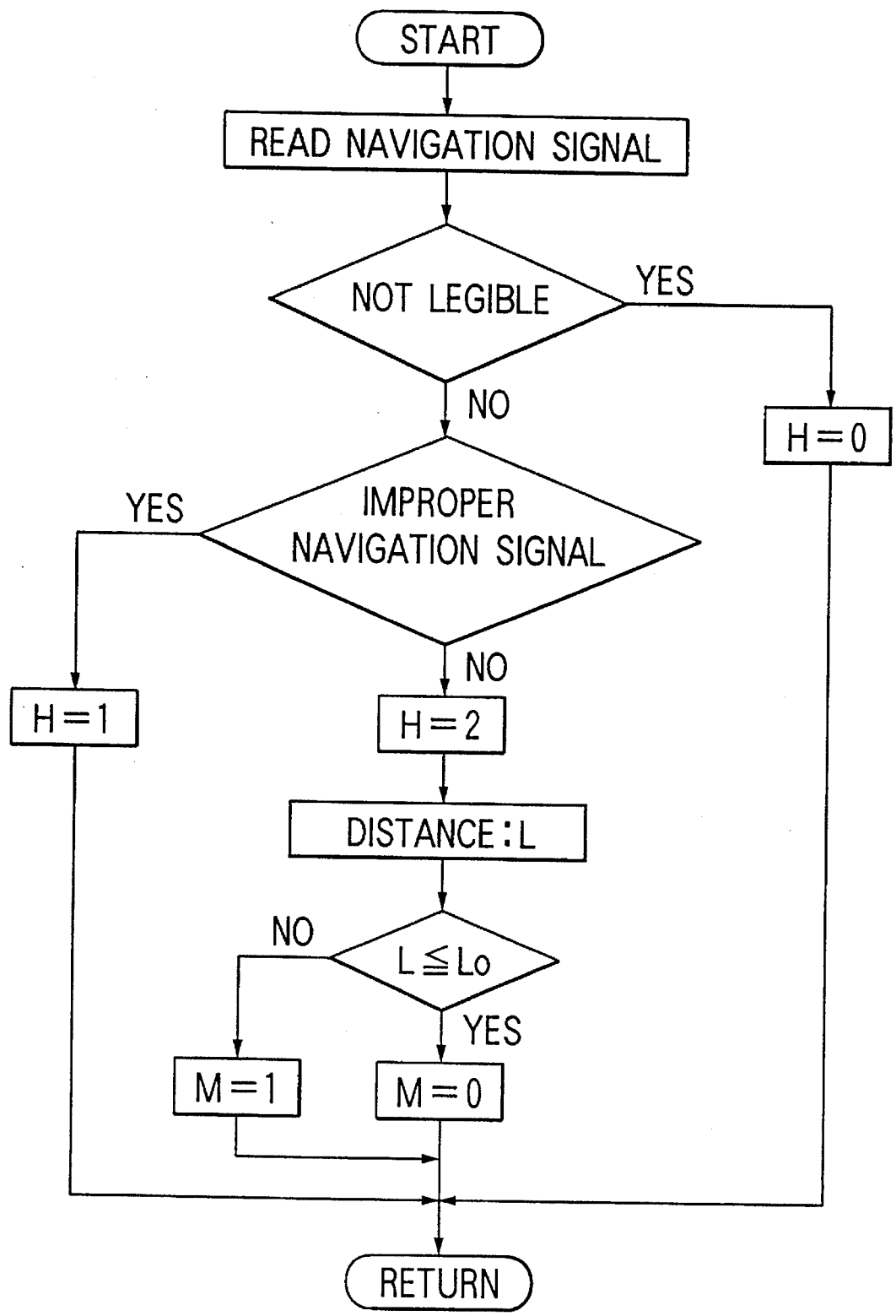
FIG. 10 is a flow chart of area judging subroutine.

Thus, the computer 50 judges the specific driver. Then, the computer 50 executes area identifying subroutine as shown in FIG. 10.

The computer 50 reads a navigation signal which is produced by the location detecting computer 53 based on the location detecting sensor 18. If the computer 50 cannot read the navigation signal, flag H is set at a value of 0 and proceedings are returned to the beginning. The flag H is provided for judging whether or not the navigation signal can be utilized for the running characteristic control properly.

If the navigation signal is not proper even when the computer 50 can read the navigation signal so that the location of the vehicle cannot be identified properly, the flag H are set at a value 1 and the proceedings is returned to the beginning.

If the location of the vehicle can be detected based on the navigation signal, the flag H is set at a value of 2. In this case, the computer 50 judges whether or not the vehicle 1 is running within the specific area where the distance L from the owner's house or dealer's office is smaller than a predetermined value L0 such as 20 km. If the vehicle 1 is judged to be in the specific area, the computer 50 sets flag M at a value of 0. If not, the flag M is set at a value of 1. The flag M is provided for judging whether or not the vehicle 1 is running within the specific area.

Figure 11:
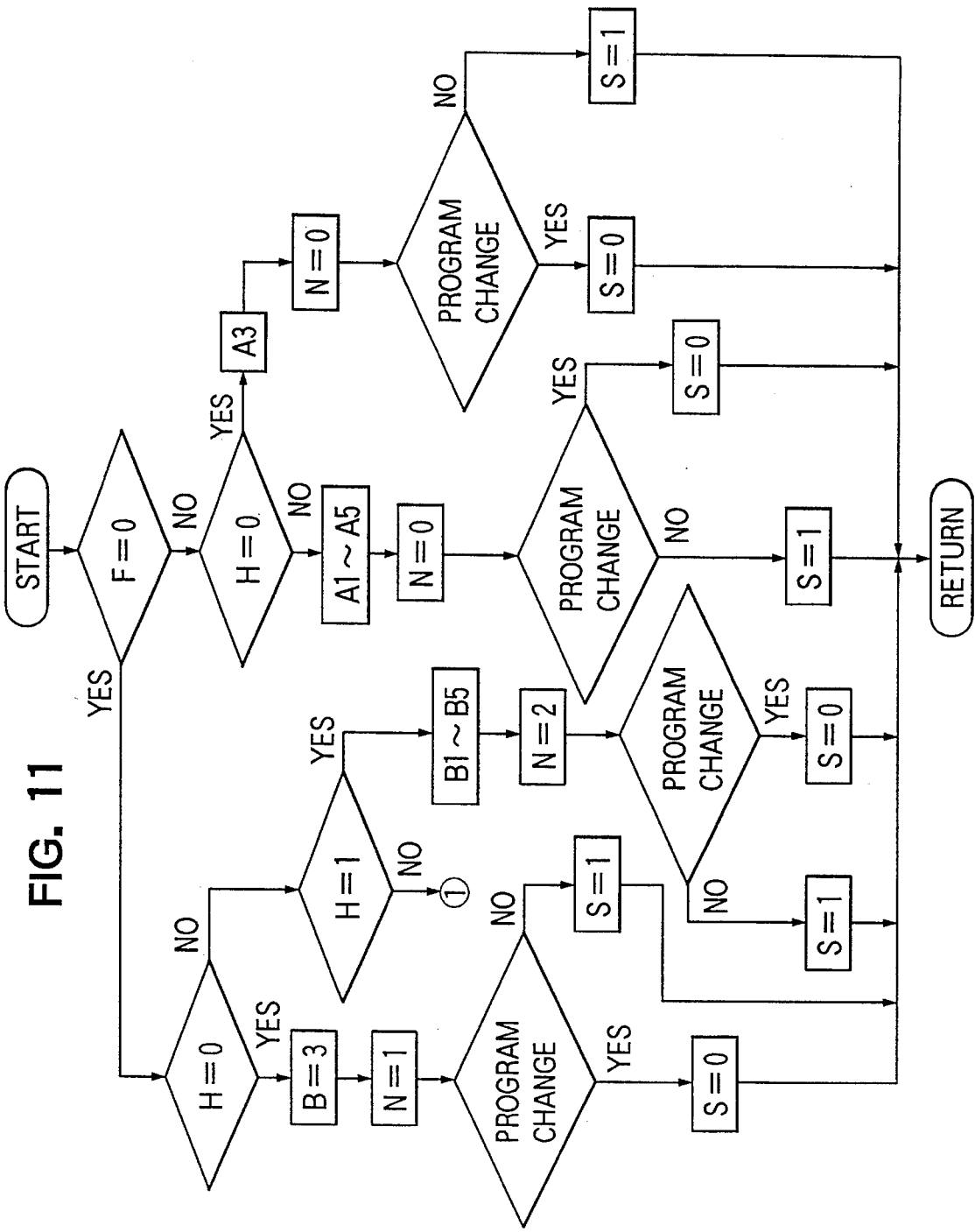
FIGS. 11 and 12 are flow charts of program selection subroutine.
Figure 12:
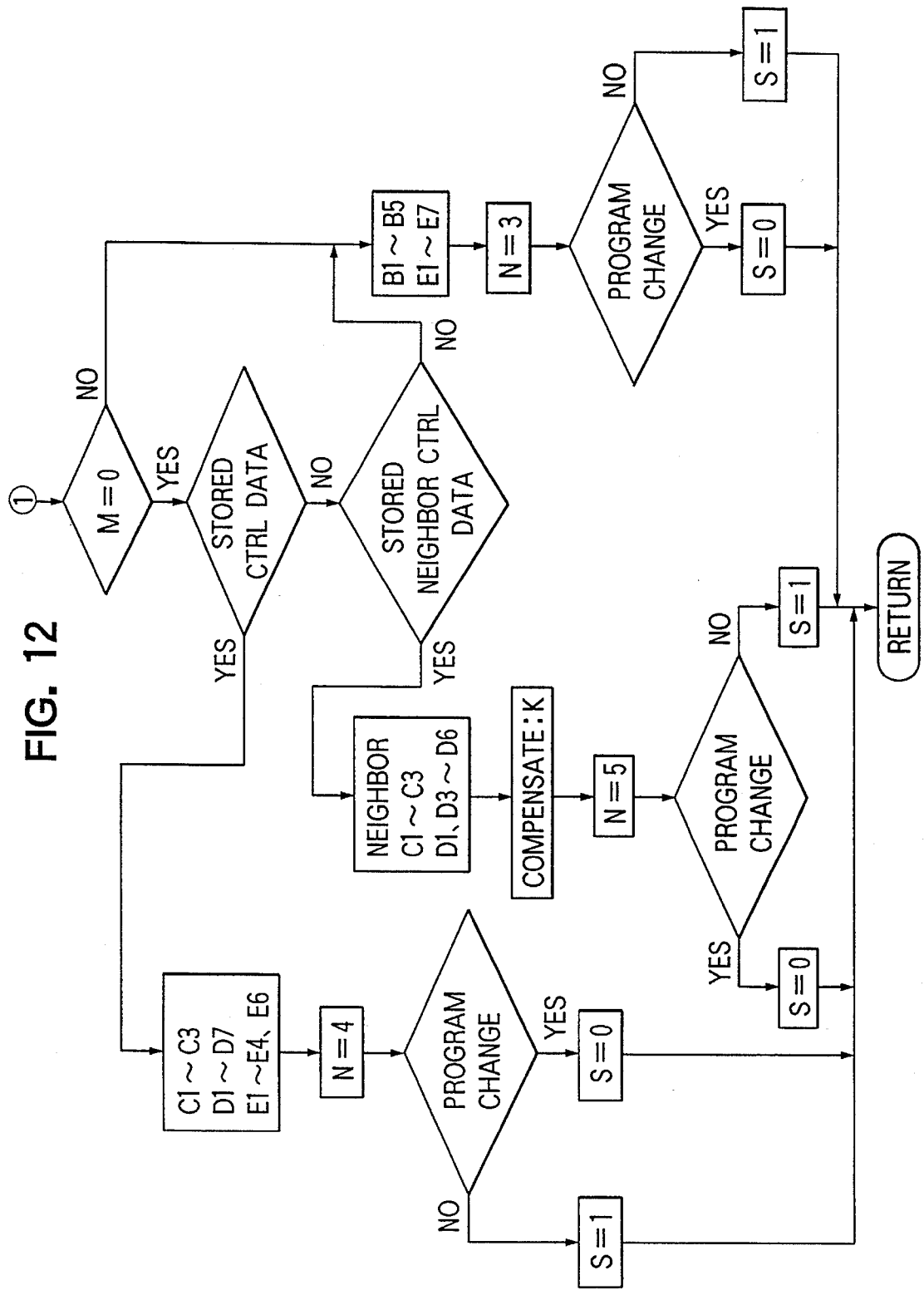

Next, the computer 50 executes subroutines shown in FIGS. 11 and 12.

In the subroutines, the computer 50 judges whether or not the specific driver drives the vehicle 1 by judging the value of the flag F. If the flag F is not zero, or if the computer holds that the specific driver does not drive the vehicle, the computer 50 next Judges whether or not the flag H is zero. If the judgment is Yes, this means that the driver is not the specific driver and the navigation signal cannot be read out. In this case, the computer 50 accesses the designated program A3 and sets flag N at a value of 0 since the program A3 is provided for a common situation. The flag N is provided for judging a program or programs which the computer should access for executing the running characteristic control. If the program to be used has been changed between the preceding cycle and the current cycle, the computer 50 sets the flag S at a value of 0. If not, the flag S is set at a value of 1.

If the flag H is not zero in the case where the driver other than the specific driver drives the vehicle 1, the computer 50 accesses the programs A1 through A5 and sets the flag N at a value of 0. If the program to be used has been changed between the preceding cycle and the current cycle, the computer 50 sets the flag S at a value of 0. If not, flag S is set at a value of 1.

If the flag F is not zero or if the driver is the specific driver, the computer 50 further judges the value of the flag H.

If the flag H is zero, this means that the vehicle is being driven by the specific driver but the navigation signal cannot be read out so that the location of the vehicle 1 cannot be detected properly. In this case, the computer 50 accesses the standard program B3 which is most common one among the programs B1 through B5. The computer 50 sets the flag N at a value of 1. Then, if the program to be used has been changed between the preceding cycle and the current cycle, the computer 50 sets the flag S at a value of 0. If not, the flag S is set at a value of 1. If the flag H is not zero in the case where the vehicle is being driven by the specific driver, the computer 50 judges whether or not the flag H is a value of 1.

If the judgment is Yes or if the flag H is a value of 1, this means that the vehicle is being driven by the specific driver but the location of the vehicle cannot be detected properly based on the navigation signal. In this case, the computer 50 accesses to the standard programs B1 through B5 and sets the flag N at a value of 2. If the program to be used has been changed between the preceding cycle and the current cycle, the computer 50 sets the flag S at a value of 0. If not, the flag S is set at a value of 1.

If the flag H is not a value 1 in the case where the vehicle 1 is being driven by the specific driver, the computer 50 judges whether or not flag M is a value of 0 so that the vehicle 1 is within the specific area.

If the flag M is not zero or if the vehicle is not in the specific area, the computer 50 accesses the standard programs B1 through B5 and compensation programs E1 through E7 stored in RAM52 and sets the flag N at a value of 3. If the program to be used has been changed between the preceding cycle and the current cycle, the computer 50 sets the flag S at a value of 0. If not, the flag S is set at a value of 1.

If the judgment is Yes or if the flag M is zero, the vehicle 1 is running in the specific area. However, the control data for the unit zone in the hourly period of the day on the day of the week may have not been stored yet in RAM 52. Therefore, the computer 50 judges whether or not the control data have been stored in RAM 52. If the judgment is Yes or if the control data have been learned and stored in RAM 52, the computer 50 accesses the learning programs C1 through C3, D1 through D7 and compensation programs E1 through E4 and E6 and sets the flag N at a value of 4. Then, if the program to be used has been changed between the preceding cycle and the current cycle, the computer 50 sets the flag S at a value of 0. If not, the flag S is set at a value of 1.

If the judgment is No or if the control data have not been stored in RAM 52, the computer 50 further judges whether or not the control data have been learned and stored in RAM with regard to a neighborhood unit zone which is located within a predetermined distance $l_0$, such as 20 m from the intended unit zone on the day of the week in the hourly period of the day. If the judgment is No or if the control data of the neighborhood unit zone have not been learned and not been stored in RAM 52, the computer 50 holds that the control cannot be made in accordance with the learning control programs but accesses the programs B1 through B5 and compensation programs E1 through E7. Then, the computer 50 sets the flag N at a value of 3. If the program to be used has been changed between the preceding cycle and the current cycle, the computer 50 sets the flag S at a value of 0. If not, the flag S is set at a value of 1.

If the judgment is Yes or if the control data for the neighborhood unit zone have been learned and stored in RAM 52, the computer 50 accesses the programs C1 through C3 and D1, D3 through D6 to compensate the control data of the neighborhood unit zone by a gain k in a manner of improving the running stability of the vehicle 1. Then, the computer 50 sets the flag N at a value of 5. This is because the control data of the neighborhood unit zone are considered to be similar to those of the intended unit zone. Thus, the computer 50 utilizes the control data of the neighborhood unit zone for the control of the intended unit zone with regard to the programs D1, D3 through D6. However, it is not considered proper that the control data of the neighborhood unit zone are used for the control of the intended unit zone with regard to the programs D2 and D7 which learn the places where the brake pedal 31 and the manual switch 34 are operated respectively. Thus, the computer 50 does not access the programs D2 and D7. Then, if the program to be used has been changed between the preceding cycle and the current cycle, the computer 50 sets the flag S at a value of 0. If not, the flag S is set at a value of 1.

Figure 13:
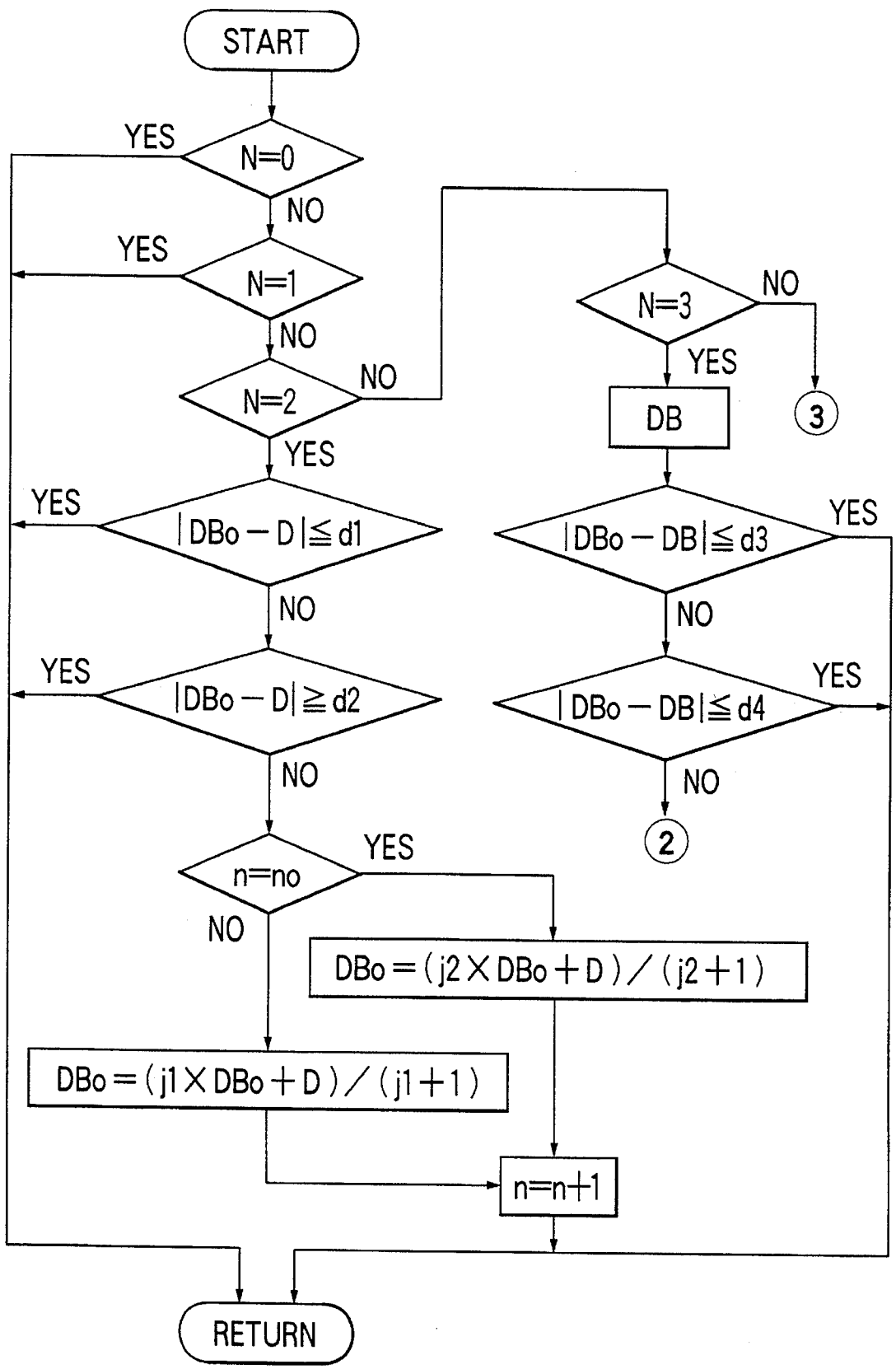
FIGS. 13 and 14 are flow charts of learning control for the control gain.
Figure 14:
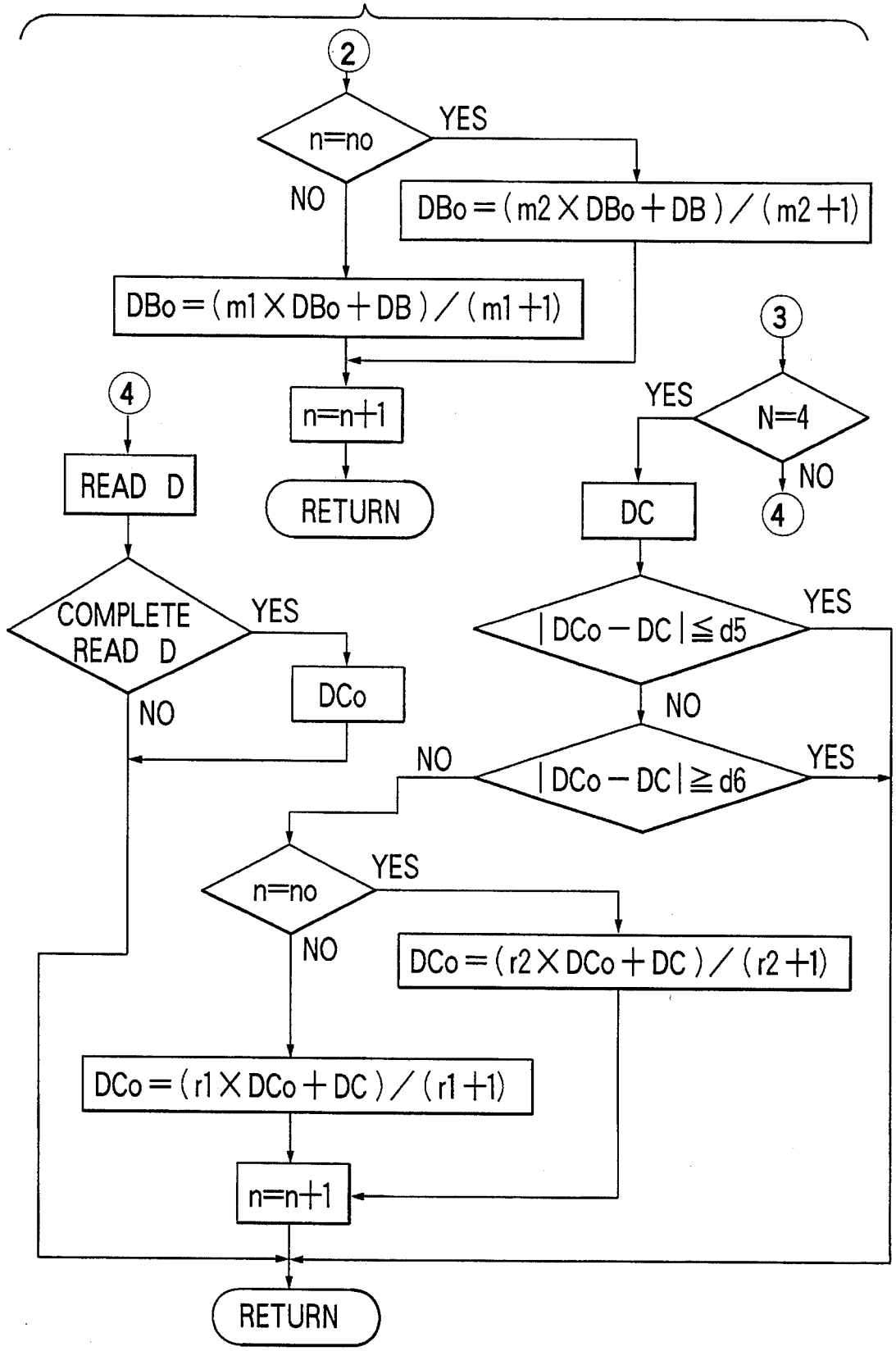

FIGS. 13 and 14 show flow charts of learning control subroutines.

The computer 50 judges whether or not the flag N is zero.

If the judgment is Yes or if the flag N takes a value of 0, the computer does not carry out the learning control since the running characteristic control is made in accordance with the designated programs A1 through A5 stored in ROM 51.

If the judgment is No or if the flag N does not take a value of 0, the computer 50 further judges whether or not the flag N takes a value of 1. If the judgment is Yes or if the flag N takes a value of 1, the computer 50 does not carry out the learning control for the running characteristic of the vehicle 1. In this case, the program B3 is selected temporarily for the running characteristic control. If the flag N is not a value of 1, the computer 50 further judges whether or not the flag N is a value of 2. If the judgment is Yes or if the flag N takes a value of 2, the computer 50 reads out one of the standard programs B1 through B5 corresponding to the classified area and reads out the control data $DB_0$ of the active suspension control device 12, anti-skid brake control device 14, gear ratio control device 7, four wheel steer control device 17, traction control device 15, engine control device 3 and power steering device 9 which are stored in RAM 52. Then, computer 50 reads running data D and judges whether or not the absolute value of the difference between the control data $DB_0$ and the running data D is not greater than a predetermined value d1 for each of the control devices.

If the judgment is Yes or if the difference is not greater than the predetermined value d1, the computer 50 does not learn the running data D since the stored data $DB_0$ are good enough to satisfy the control. If the judgment is No or if the difference is greater than the predetermined value d1, the computer 50 further judges whether or not the difference is not smaller than another predetermined value d2 (d2>d1).

If the judgment is Yes or if the difference is not smaller than the predetermined value d2, the computer 50 does not learn the running data D because the running data D is not reliable. If the judgment is No or if the difference is smaller than the value d2, the computer 50 judges whether or not the number of renewal times n reaches a predetermined number $n_0$.

If the number of renewal times does not reach the number $n_0$, the computer 50 calculates a new control data $DB_0$ by the following formula which provides a relatively great compensation:

$$DB_0=(j1*DB_0+D)/(j1+1)$$

Wherein j1 is a predetermined coefficient, for example 10000. Then, the number of renewal times n is calculated as n=n+1 and stored in RAM 52. The calculated value of the control data $DB_0$ is newly stored in RAM 52 replacing the existing control data $DB_0$. In other words, the new control data $DB_0$ has been learned.

If the number of renewal times reaches the predetermined value $n_0$, the computer 50 calculates new control data in accordance with the following formula which provides a relatively small compensation:

$$DB_0=(j2*DB_0+D)/(j2+1)$$

Wherein j2 is a predetermined coefficient (j1<j2), for example 15000. Then, the number of renewal times n is increased by one (n=n+1) and stored in RAM 52.

If the flag N does not take a value of 2, the computer 50 further judges whether or not the flag N is a value of 3.

If the judgment is Yes or if the flag N takes a value of 3, the computer 50 reads out one of the standard programs B1 through B5 which corresponds to the classified area where the vehicle is running. Then, the computer 50 reads out the control data $DB_0$ of the standard program selected and reads running control data D. The computer 50 compensates the control data $DB_0$ based on the running data D in accordance with the compensation programs E5 through E7 to get compensated data DB. Thereafter, the computer 50 judges whether or not the absolute value of the difference between the control data $DB_0$ and compensated data DB is not greater than a predetermined value d3 for each of the control devices.

If the judgment is Yes or if the difference is not greater than the value d3, the computer 50 does not learn the compensated data DB. If the judgment is No or if the difference is greater than the value d3, the computer 50 further judges whether or not the difference between the values $DB_0$ and DB is not smaller than a predetermined value d4 for each of the control devices (d4>d3). If the judgment is Yes or if the difference is not smaller than the value d4, the computer 50 does not learn the compensated data DB.

If the judgment is No or if the difference is smaller than the value d4, the computer 50 further judges whether or not the number of renewal times n reaches the value $n_0$.

If the judgment is No, the computer 50 carries out the learning control in accordance with the following formula which provides a relatively great compensation:

$$DB_0=(m1*DB_0+DB)/(m1+1)$$

Wherein m1 is a predetermined coefficient, for example 10000. Then, the number of renewal times n is counted as n=n+.

If the number of renewal times n reaches the predetermined value $n_0$, the computer 50 calculates new control data in accordance with the following formula which provides a relatively small compensation:

$$DB_0=(m2*DB_0+DB)/(m2+1)$$

Wherein m2 is a predetermined coefficient (m1<m2), for example 15000. Then, the number of renewal times n is increased by one (n=n+1) and stored in RAM 52.

If the flag N does not take a value of 3, the computer 50 judges whether or not the flag N is a value of 4. If the judgment is Yes or if the flag N is a value of 4, this means that the vehicle 1 is in the specific area and the control data for every unit zone have been already stored in RAM 52.

The computer 50 reads out the learning programs C1 through C3 and D1 through D7 and calculates the control data $DC_0$ of the programs C1 through C3 based on the control data.

The computer 50 reads the running data D and compensates the control data $DC_0$ in accordance with the programs C1 through C3 and D1 though D7 to get the control data DC. Then, the computer 50 judges whether or not the absolute value of the difference between the values $DC_0$ and DC is not greater than a predetermined value d5. If the judgment is Yes or if the difference is not greater than the value d5, the computer 50 does not learn the control data DC. If the judgment is No or if the difference is greater than the value d5, the computer 50 further judges whether or not the difference is not smaller than a predetermined value d6 (d6>d5).

If the judgment is Yes or if the difference is not smaller than the value d6, the computer 50 does not learn the compensated data DC.

If the judgment is No or if the difference is smaller than the value d6, the computer 50 further judges whether or not the number of renewal times n reaches the value $n_0$.

If the judgment is No, the computer 50 carries out the learning control in accordance with the following formula which provides a relatively great compensation:

$$DB_0 = (r1*DC_0 + DC)/(r1+1)$$

Wherein m1 is a predetermined coefficient, for example 100. Then, the number of renewal times n is counted as n=n+1.

If the number of renewal times n reaches the predetermined value $n_0$, the computer 50 calculates new control data in accordance with the following formula which provides a relatively small compensation:

$$DB_0 = (r2*DC_0 + DC)/(r2+1)$$

Wherein r2 is a predetermined coefficient (r1<r2), for example 150. Then, the number of renewal times n is increased by one (n=n+1) and stored in RAM 52.

If the flag N does not take a value of 4, the value of the flag N is 5.

In this case, the computer 50 reads the running data D.

As for the learning programs D1, D3 through D6, when the vehicle 1 has run on the same unit zone p times, such as 10 times or 50 times on the same day of the week in the same hourly period of the day, the number p of the running data D can be obtained. The control data $DC_0$ can be obtained by summing the running data D up and dividing by the number p and are stored in RAM 52.

The running data D is obtained by taking an average of running data or actual control data for the control devices for controlling the running characteristics of the vehicle 1 based on signals from the integrating meter 41 and other sensors in a plurality of unit zones. The unit zone is defined as a predetermined running distance of the vehicle 1, such as 1 km wherein an overlapped portion, for example, 100 m is provided between the adjacent unit zones or a predetermined running time, such as 10 minutes running time wherein an overlapped portion, for example 1 minute is provided between the adjacent unit zones.

The control data $DC_0$ are obtained in accordance with the learning programs C1 through C3 and D1 through D7. The compensation data DC is obtained based on the running data D in accordance with the learning program C1 through C3 and D1 through D7. Hereinafter, how to obtain the running data D will be explained in detail with regard to ACS.

Figure 15:
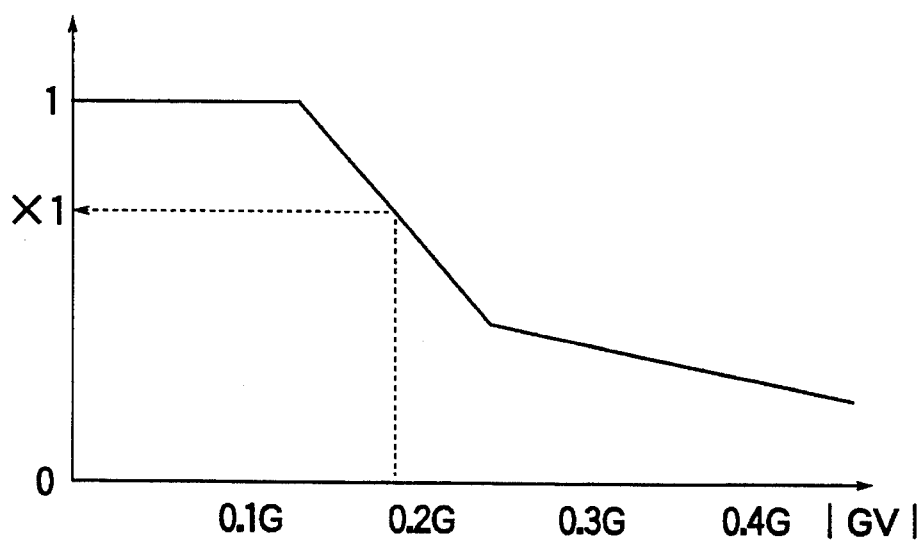
FIG. 15 is a graphical representation of a map for obtaining compensation data in connection with the vertical acceleration.

FIGS. 14 and 15 shows maps which are used when compensating the control data for ACS in accordance with the learning programs C1 through C3 for learning terrain condition.

FIG. 14 is a map showing a relationship between the vertical acceleration GV and compensation data. FIG. 15 is a map showing a relationship between the lateral acceleration GL and the compensation data which are stored in ROM 51. The compensation data x1 for the program C1 is obtained based on a signal from the vertical acceleration sensor 47 in light of a map shown in FIG. 15. The FIG. 1 corresponds to the hardest suspension characteristic. The FIG. 0 corresponds to the softest suspension characteristic.

Figure 16:
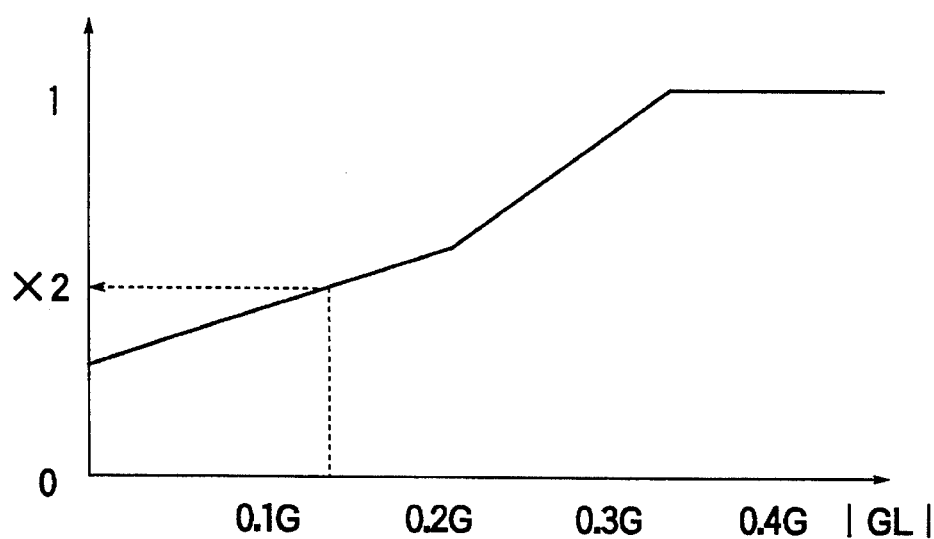
FIG. 16 is a graphical representation of a map for obtaining compensation data in connection with the lateral acceleration of the vehicle.

The compensation data x2 is calculated based on a signal from the lateral acceleration sensor 46 in light of the map as shown in FIG. 16.

It will be understood that ACS control data is not compensated by the program C3. Compensation data Xc for the programs C1 through C3 is calculated based on the data x1 and x2.

$$Xc = (x1+x2)/2$$

Similarly, the compensation data Xd is calculated in light of a map (not shown).

The compensation data DC is obtained through the following formula based on the data Xc and Xd.

$$DC = (K1*Xc + K2*Xd)/(K1+K2)$$

K1, K2 are weight coefficients (K1<K2). As aforementioned, the computer 50 compares the data $DC_0$ which have been obtained in the preceding cycle with the data DC obtained by the above procedure so as to determine whether the learning control should be made.

Likewise, the compensation data DB are obtained based on the running data D in accordance with the compensation programs E5 through E7 in the standard programs B1 through B5.

Figure 17:
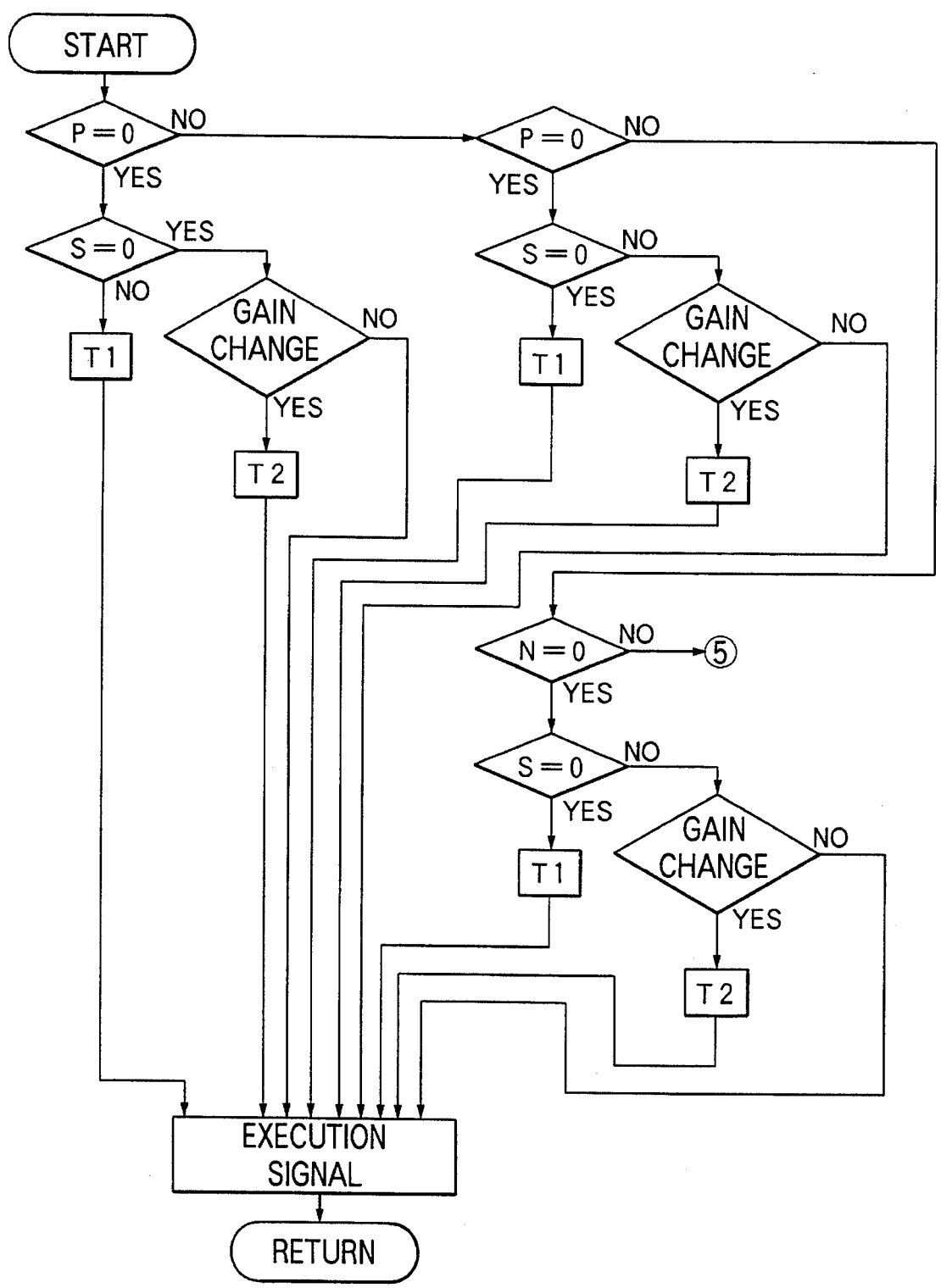
FIGS. 17, 18 and 19 are flow charts of a subroutine for execution of learning control.
Figure 18:
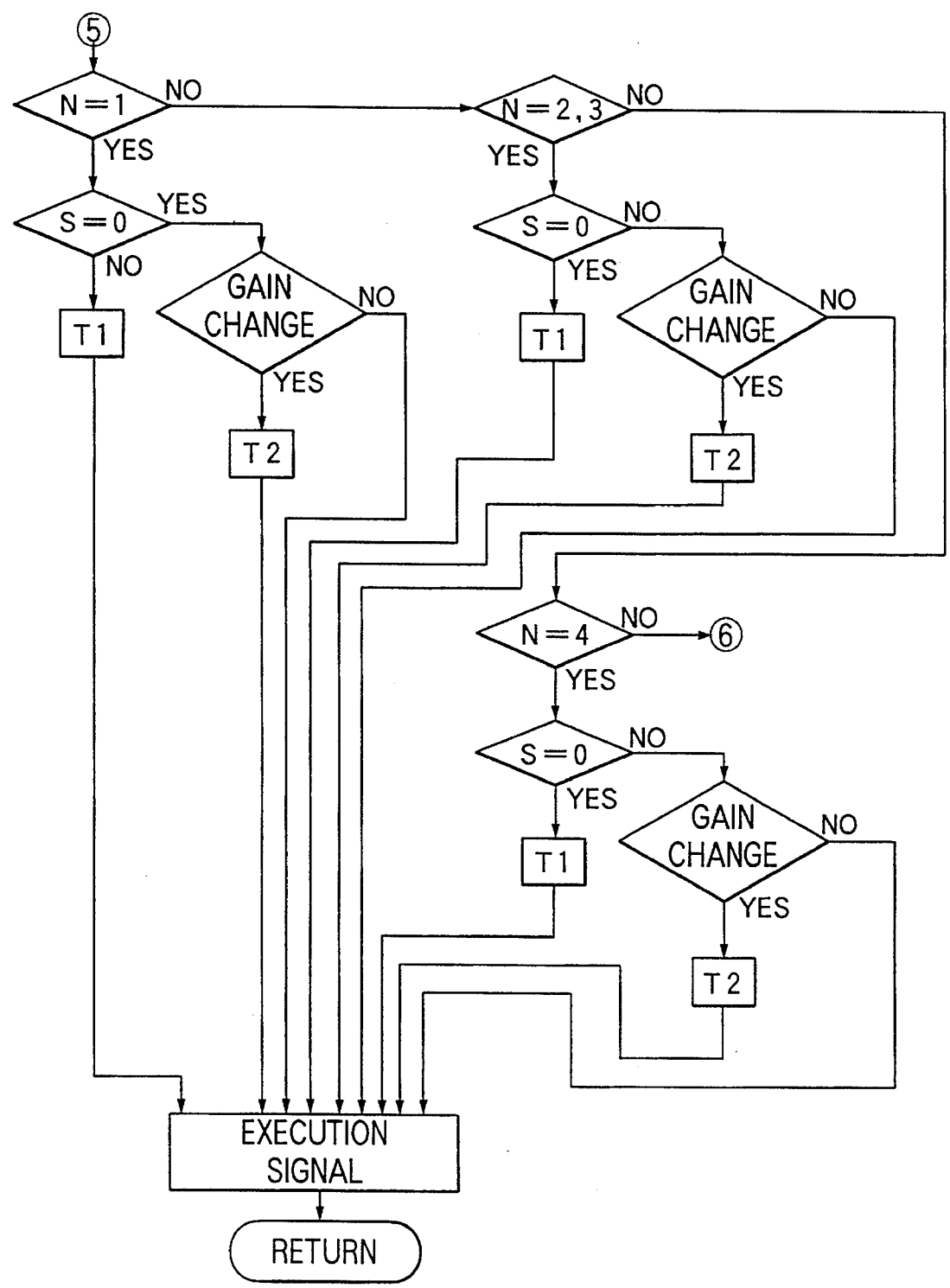
Figure 19:
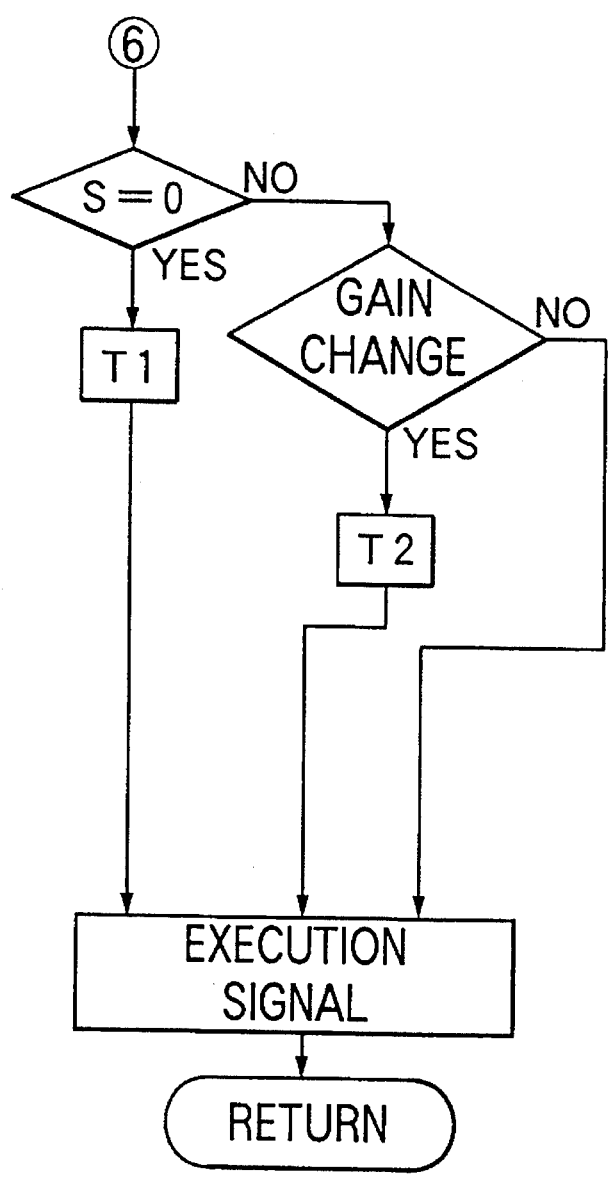

FIGS. 17, 18 and 19 show flow charts of execution control subroutine.

In FIGS. 17, 18 and 19, the computer 50 judges whether or not flag P is a value of 0.

If the judgment is Yes of if the flag P is 0, it is considered that the control should be made in accordance with the designated program A7. In this case, the computer 50 further judges whether or not the flag S is a value of 0. If the flag S is 0, it is considered that the driver has been changed and the program has been changed between the preceding cycle and the current cycle. In order to prevent an abrupt change in the running characteristic of the vehicle, the computer 50 gives control time period T an increment T1. Then, computer 50 produces a control execution signal so that the control gains gradually reach the value obtained in the current cycle after the control time period T is over.

If the flag S is not 0, the computer 50 further judges whether or not the control gains have been changed between the preceding cycle and the current cycle. If the judgment is Yes or if the control gain have been changed, the computer 50 gives the control time period T an increment T2. Then, the computer 50 produces the execution control signal in a manner that the control gains reach the target value which is obtained in the current cycle after the control time period T is over.

If the flag P is not 0, the computer 50 further judges whether or not the flag P is 1. If the flag P is 1, it is considered that the vehicle is running on a low friction road and that the running stability should be obtained in accordance with the designated program A6. The computer then judges whether or not the flag S is 0. If the flag S is 0, it is considered that the driver has been changed and the program to be used has been changed between the preceding cycle and the current cycle. In order to prevent the abrupt change in the running characteristic, the computer 50 gives the control time period T an increment T1. If the flag S is not 0, the computer 50 gives the control time period the increment T2.

The computer 50 produces the execution control signal in the same manner as aforementioned.

If the flag P is not 1, the computer judges whether or not the flag N is 0. If the flag N is 0, it is considered that the control should be made in accordance with the designated programs A1 through A5 stored in ROM 51. The computer 50 further judges whether or not the flag S is 0. If the flag is 0, the computer 50 gives the control time period T the increment T1. If the flag S is not 0, the control time period T is increased by the increment T2. Then, computer 50 produces the execution control signal in the similar manner in accordance with the designated programs A1 through A5.

If the flag N is not 0, the computer 50 further judges whether or not the flag N is 1. If the flag N is 1, the running characteristic control is made in accordance with the standard program B3. Then, the computer 50 further judges whether or not the flag S is 0. If the flag S is 0, the computer 50 increases the control time period T by the increment T1. If the flag S is not 0, the computer 50 compensates uniformly the control gains obtained based on the compensation programs E1 through E4 in accordance with the standard program B3 as shown in FIG. 7 so as to calculate the control gains for the respective control devices.

When the computer detects that the vehicle is running at night based on the clock 40, the computer 50 compensates the control data DB for the respective control devices of the standard program corresponding to the classified area where the vehicle 1 is running. If the computer 50 detects that traffic condition is bad based on the navigation signal and vehicle speed signal from the vehicle speed sensor 43, the data DB is compensated. Similar compensation is made if the computer detects that it is raining or snowing because of the operation of the wiper and if the computer holds that the continuous running time is very long based on the signal from the meter 41 and clock 40.

Then, the computer judges whether or not the control gains have been changed between the preceding cycle and the current cycle.

If the control gains have been changed, the control time period T is increased by the time T2 for suppressing an abrupt change of the running characteristic of the vehicle 1. Then, the computer 50 produces the execution signal providing the gradual change in the control gains.

If the flag N is not 1, the flag N is judged as to whether the flag N is 2 or 3 as shown in FIG. 18.

If the flag N is 2 or 3, the computer 50 starts the control in accordance with the standard programs B1 through B5. In this case, the computer 50 judges whether or not the flag S is 0. If the flag S is 0, the computer 50 increases the control time period T by the increment T1. If the flag S is not 0, the computer 50 compensates uniformly the control gains based on the compensation programs E1 through E4 in accordance with one of the standard programs B1 through B5 as shown in FIG. 7. Then, the computer 50 judges whether or not the control gains have been changed between the preceding cycle and the current cycle.

Then, the computer 50 increases the control time period T by the increment T2. Then, the computer 50 produces the execution signal for the control devices as aforementioned.

If the flag N is neither 2 nor 3, the computer 50 judges whether or not the flag N is 4.

If the flag N is 4, the computer 50 starts the control in accordance with the programs C1 through C3 and D1 through D7.

In this control, the computer judges the value of the flag S. If the flag S is 0, the computer 50 increases the control time period T, which is stored in the timer of the respective control devices, by the increment T1. If the flag S is not 0, the computer 50 uniformly compensates the control gains as aforementioned as shown in FIG. 7. Then, the computer 50 increases the control time period T by the increment T2 if the control gains have been changed between the preceding cycle and the current cycle.

If the flag N is not 4, the computer 50 executes the running characteristic control utilizing the control data for the neighborhood unit zone with regard to the programs C1 through C3 and D1, D3 through D6. However, this control does not apply the programs D2, D7. In these programs, the control data are learned in connection with the places where the brake pedal 31 and the manual switch 34 have been operated. Thus, it is unlikely that the control data of the neighborhood unit zone can be properly employed for the control of the intended area.

Next, the computer 50 judges the value of the flag S. If the flag S is 0, the control time T stored in the timer of the control device is increased by the time T1. If the flag S is not 0, the computer 50 compensates uniformly the control data of the neighborhood unit zone to obtain the control gains. Then, the computer 50 judges the change of the control gains. If the control gains have been changed, the computer 50 increases the control time T by the time T2 as aforementioned. Then, the execution signal is produced for executing the running characteristic control of the vehicle.

According to the illustrated embodiment, the designated programs A1 through A5 are provided with control gains corresponding to the classified area where the vehicle is running, such as the city area, urban area, suburban area, mountain area and free way area. The designated program A6 is provided with the control gains which are used when the lateral acceleration of the vehicle GL is greater than the predetermined value $GL_0$. The designated program A7 is used when the vehicle runs on a low friction road. The standard programs B1 through B5 learn the running conditions when the specific driver drives the vehicle corresponding to the terrains as aforementioned. The programs C1 through C3 and D1 through D7 learn the running condition when the specific driver drives within the specific area where the vehicle is located within a predetermined distance $L_0$ from a predetermined place, such as the owner's house, dealer's office. The compensation program compensates the standard programs B1 through B5, C1 through C3 and D1 through D7. Thus, when the specific driver drives in the specific area, for example, for work, suitable control gains of the running characteristic will be provided through the learning programs C1 through C3 and D1 through D7 which learn the terrain within the specific area and the specific driver's operation for every unit zone. When the specific driver drives the vehicle 1 in the area other than the specific area, the standard programs B1 through B5 compensated by the programs E1 through E7 from the designated programs A1 through A5 in accordance with the classified area provide satisfactory control gains controlling the running characteristic. When a driver other than the specific driver drives the vehicle 1, the designated programs A1 through A5 provide desirable control gains corresponding to the classified area. When the lateral acceleration GL of the vehicle 1 is greater than the value $GL_0$, the designated program A6 is used for controlling the control gain of the running characteristic prior to other programs. Further, when the vehicle runs on a low friction road, the designated program A7 is used for controlling the control gains of the running characteristic of the vehicle prior to other programs so that the running stability can be obtained.

Figure 20:
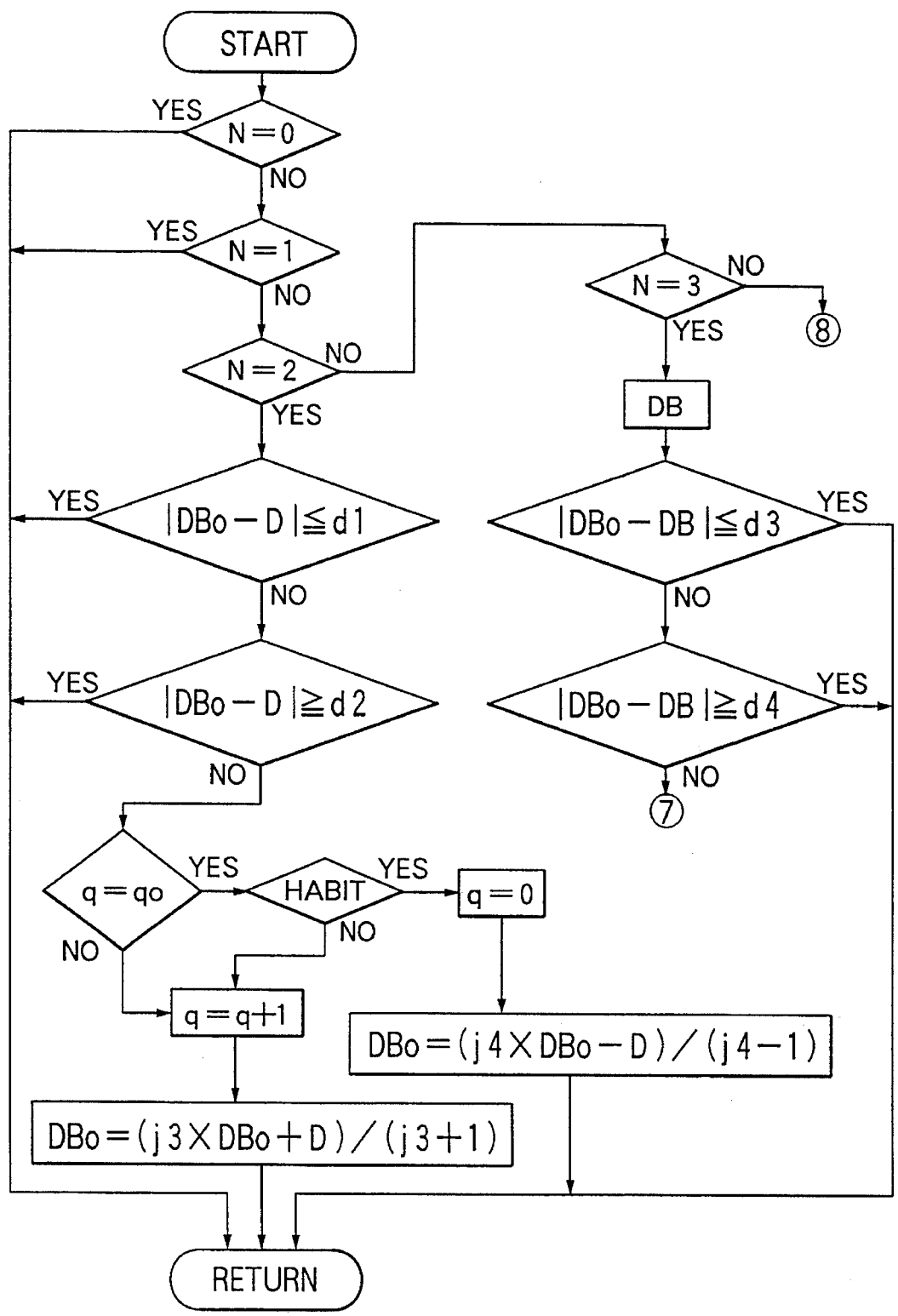
FIGS. 20 and 21 are flow chart of a subroutine for execution of the learning control in accordance with another embodiment of the present invention.
Figure 21:
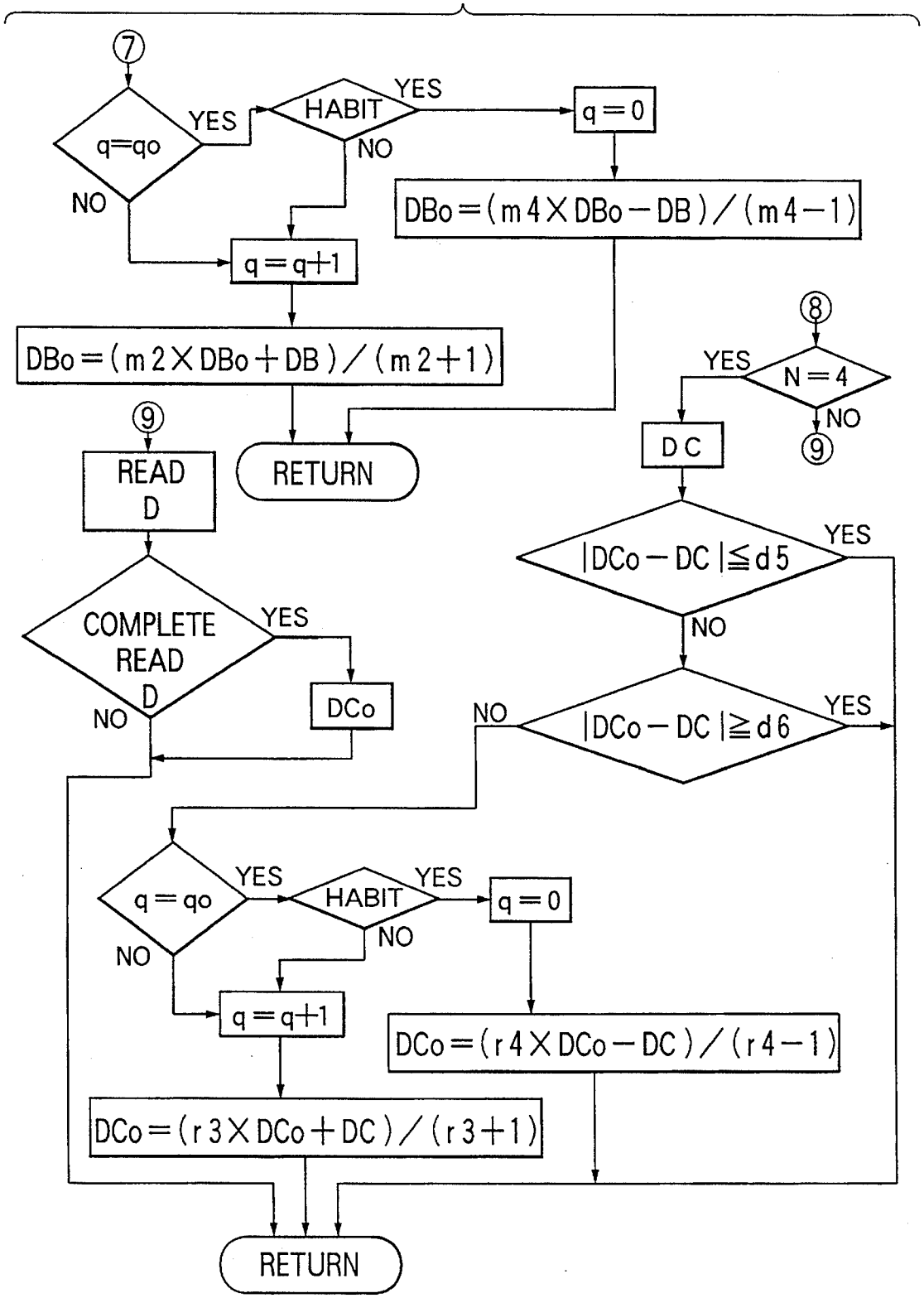

Referring to FIGS. 20 and 21, there is shown another embodiment of the present invention. In the illustrated embodiment, the control gains of the running characteristic are compensated properly if it is judged that the learned control gains are obtained in accordance with the operation based on the driver's habit.

If the flag N takes the value 2 and the learning control can be carried out in accordance with the navigation signal, the computer 50 judges whether or not the difference between the control data $DB_0$ stored in RAM 52 and the running data D is not greater than the predetermined value d1. If Yes, the computer 50 further judges whether or not the difference is not smaller than the value d2. If Yes, the computer 50 judges if the number of renewal times q of the control data $DB_0$ reaches $q_0$. If Yes, the computer 50 judges whether or not the specific driver's operation has been changed as a result of the learning control for the control data of the running characteristic of the vehicle. In other words, the computer 50 judges whether or not the difference between the control data $DB_0$ in RAM 52 and the running data D is getting small as a result of the learning control for the control data $DB_0$. If Yes, the computer 50 holds that the learning control for the control data of the running characteristic of the vehicle is well matched with the driver's operation of the vehicle and that the specific driver has no habitual driving operation to be compensated.

The computer 50 calculates new control data in accordance with the following formula:

$$DB_0=(j3*DB_0+D)/(j3+1)$$

Wherein J3 is a predetermined coefficient, for example 10000. Then, the number of renewal times n is increased by one (q=q+1) and stored in RAM 52.

On the other hand, if the difference between the control data $DB_0$ and the running data D is not reduced in spite of the learning control in which the control data have been changed as many as $q_0$ times, the computer holds that this result comes out of the specific habitual driving operation. In this case, the computer 50 resets the number of renewal times q at 0. Then, the computer 50 compensates the control data in accordance with the following formula:

$$DB_0=(j4*DB_0-D)/(j4-1)$$

This control is also made when the flag N is 3 and 4 as shown in FIG. 21.

In further embodiment of the present invention, the compensation for the control gain is reduced when the driver's operation of an element such as an acceleration pedal, a shift lever, the steering wheel, and the like does not change substantially in view of statistic data in spite of increase of the number of the renewal times of the control gain.

Alternatively, the control gain is compensated so as to improve the running stability of the vehicle when the driver's operation does not change substantially in view of statistic data in spite of increase of the number of the renewal times of the control gain.

The control gain may be compensated to a predetermined value when the driver's operation does not change substantially in view of statistic data in spite of increase of the number of the renewal times of the control gain.

In another manner, the control gain is temporarily increased when the driver's operation does not change statistically and substantially in spite of increase of the number of the renewal times of the control gain, and then the control gain is reduced eventually if the driver's operation does not change irrespective of the temporary increase of the control gain. Preferably, the control gain is reduced gradually after the temporary increase thereof.

In another embodiment, the gain control means suspends the learning control when the driver's operation is substantially different from the driver's operation obtained through the learning control.

Figure 22:
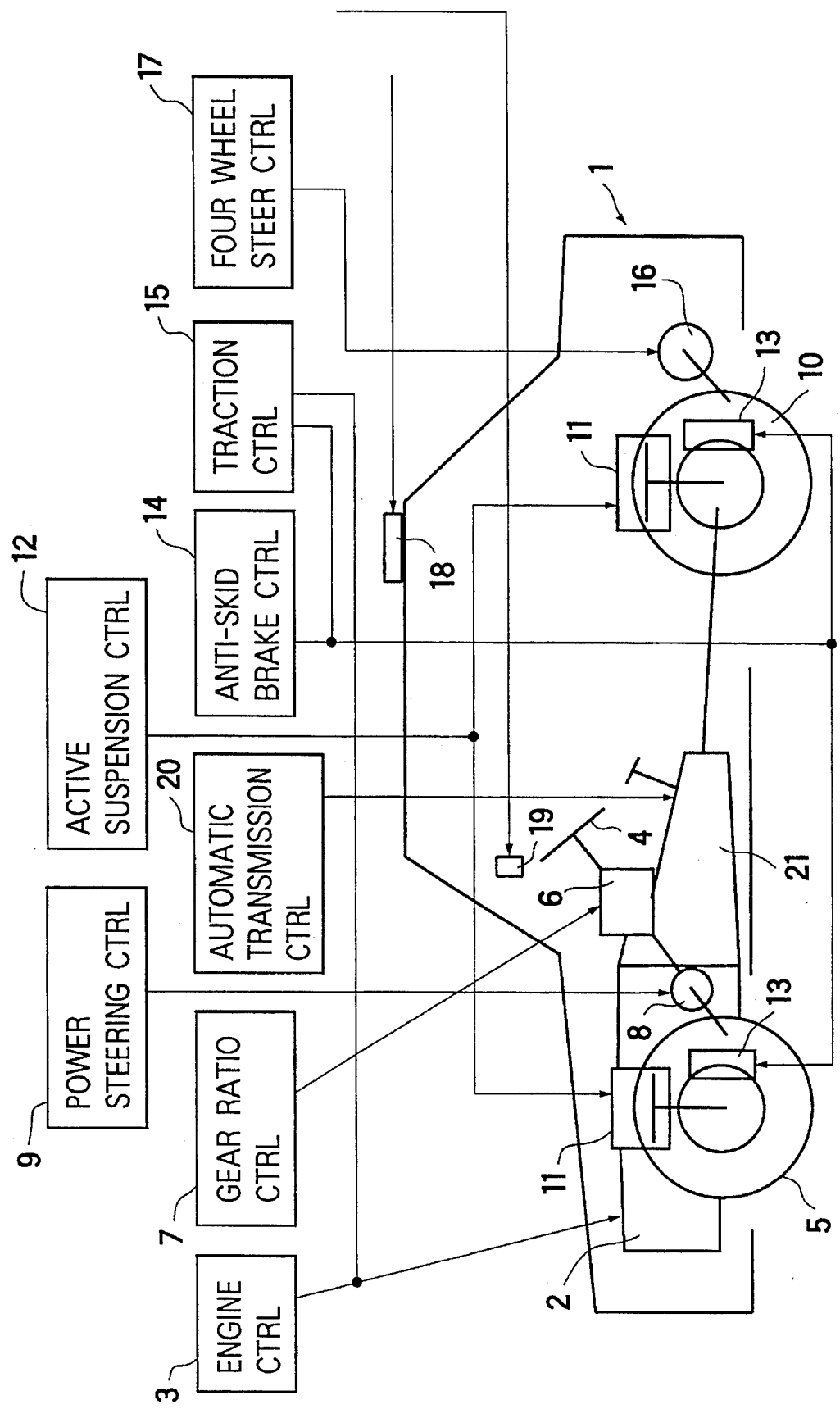
FIG. 22 is a schematic block diagram of the learning control system of the vehicle in accordance with another embodiment.
Figure 23:
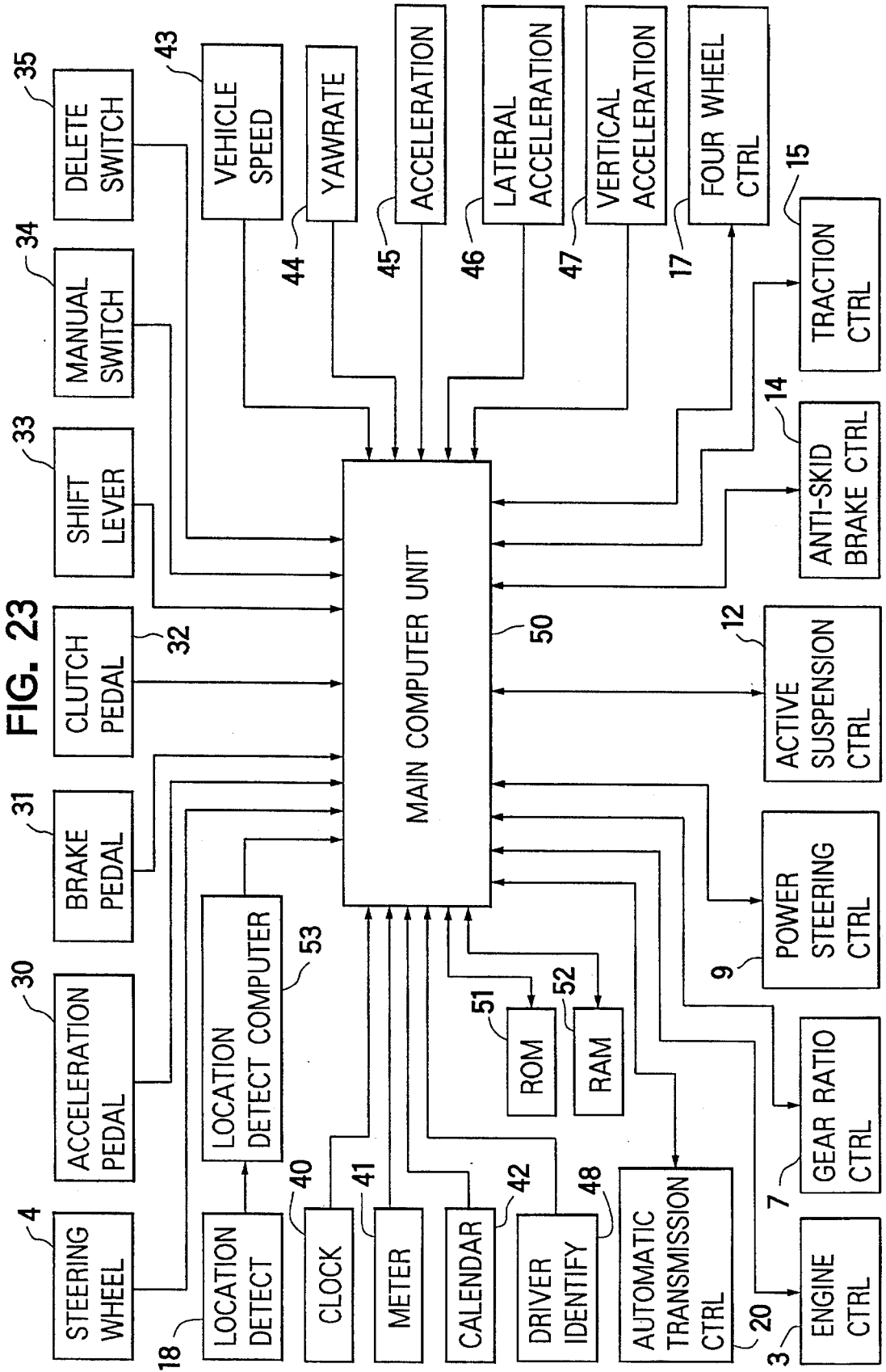
FIG. 23 is a block diagram similar to FIG. 2 but following another embodiment of the present invention.

Referring to FIG. 22, there is shown another structure of the vehicle in accordance with the present invention. The illustrated vehicle is provided with an automatic transmission system 20 and control system thereof as shown in FIG. 23. As ATC ratio corresponding to VGR in FIG. 4 increases, engine output increases. In this embodiment, the value of the ATC is set at 1, 2, 3, 5, 3, 1 and 5 for the programs A1 through A7 respectively instead of the value of VGR. For the program B3, the ATC is set at 2.

It will be understood that the designated programs A1 through A5 can be used when the specific driver drives the vehicle 1 in the area other than the specific area. In this case, if the navigation signal cannot be used for the control, the programs A1 through A5 can be used in lieu of the programs B1 through B5 and the programs. In further embodiment, the programs C1 through C3 can be used when the driver other than the specific driver drives the vehicle within the specific area.

In another embodiment, the driver identifying device detects ID number of the driver which is inputted by the driver.

In further embodiment, if the computer 50 detects the driver's habitual operation, the computer 50 reduces the compensation of the control gains so as to prevent running instability.

Figure 27:
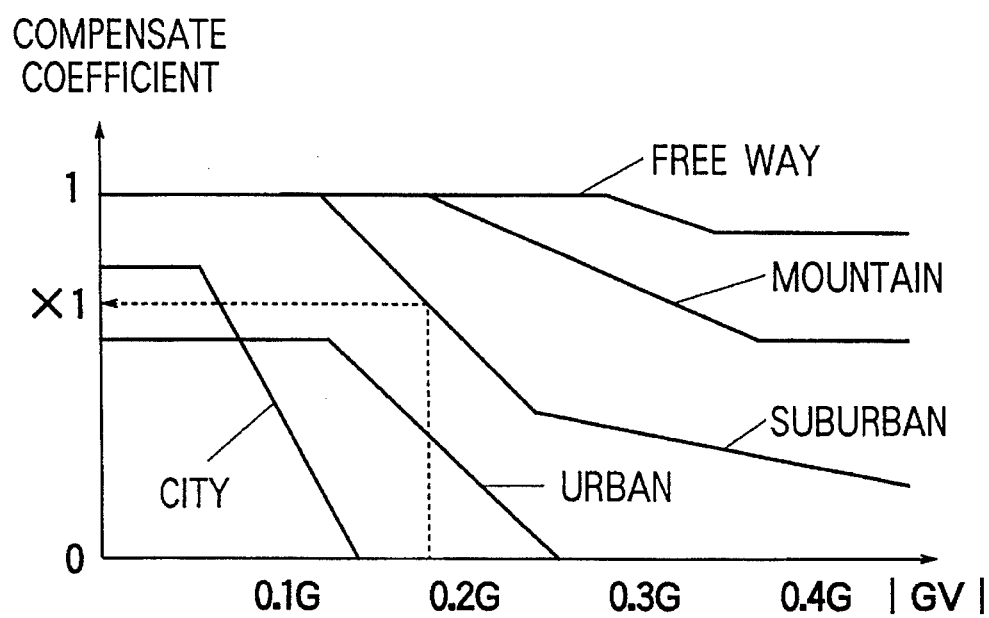
FIG. 27 is a graphical representation for obtaining the compensation data in connection with the vertical acceleration.
Figure 28:
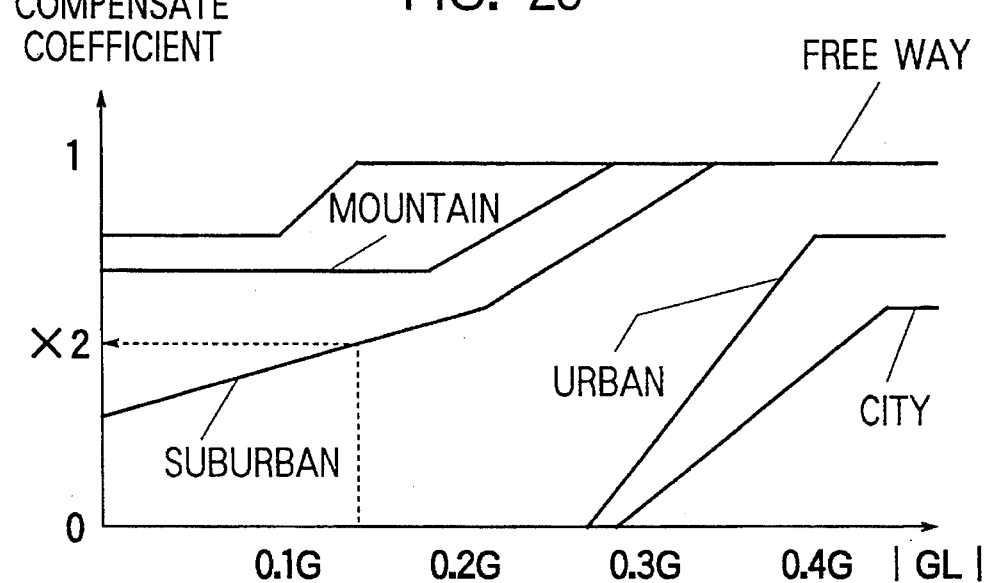
FIG. 28 is a graphical representation for obtaining the compensation data in connection with the lateral acceleration of the vehicle.
Figure 29:
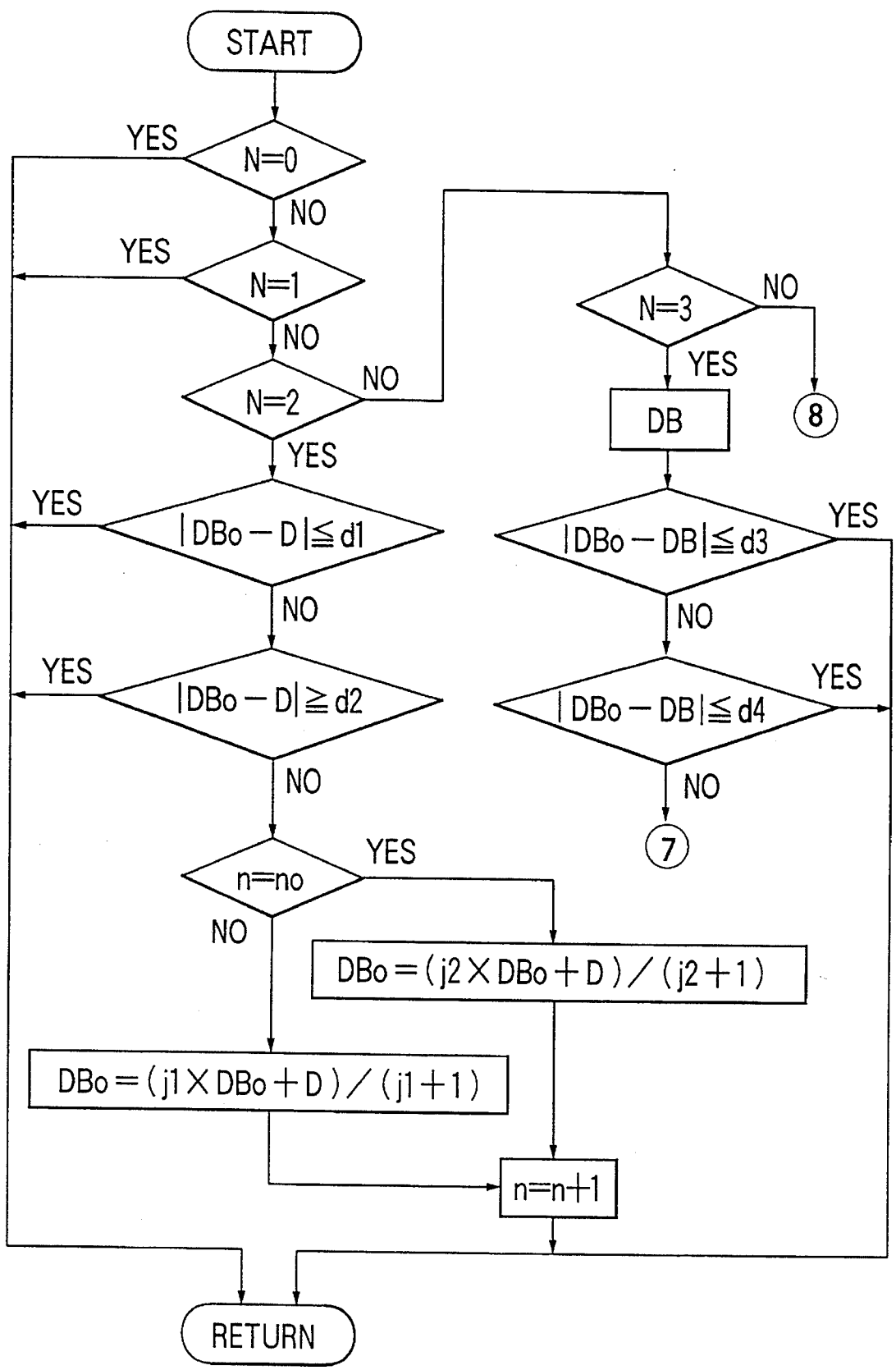
FIGS. 29, 30 and 31 are flow charts of a subroutine of learning control of further embodiment of the invention.
Figure 30:
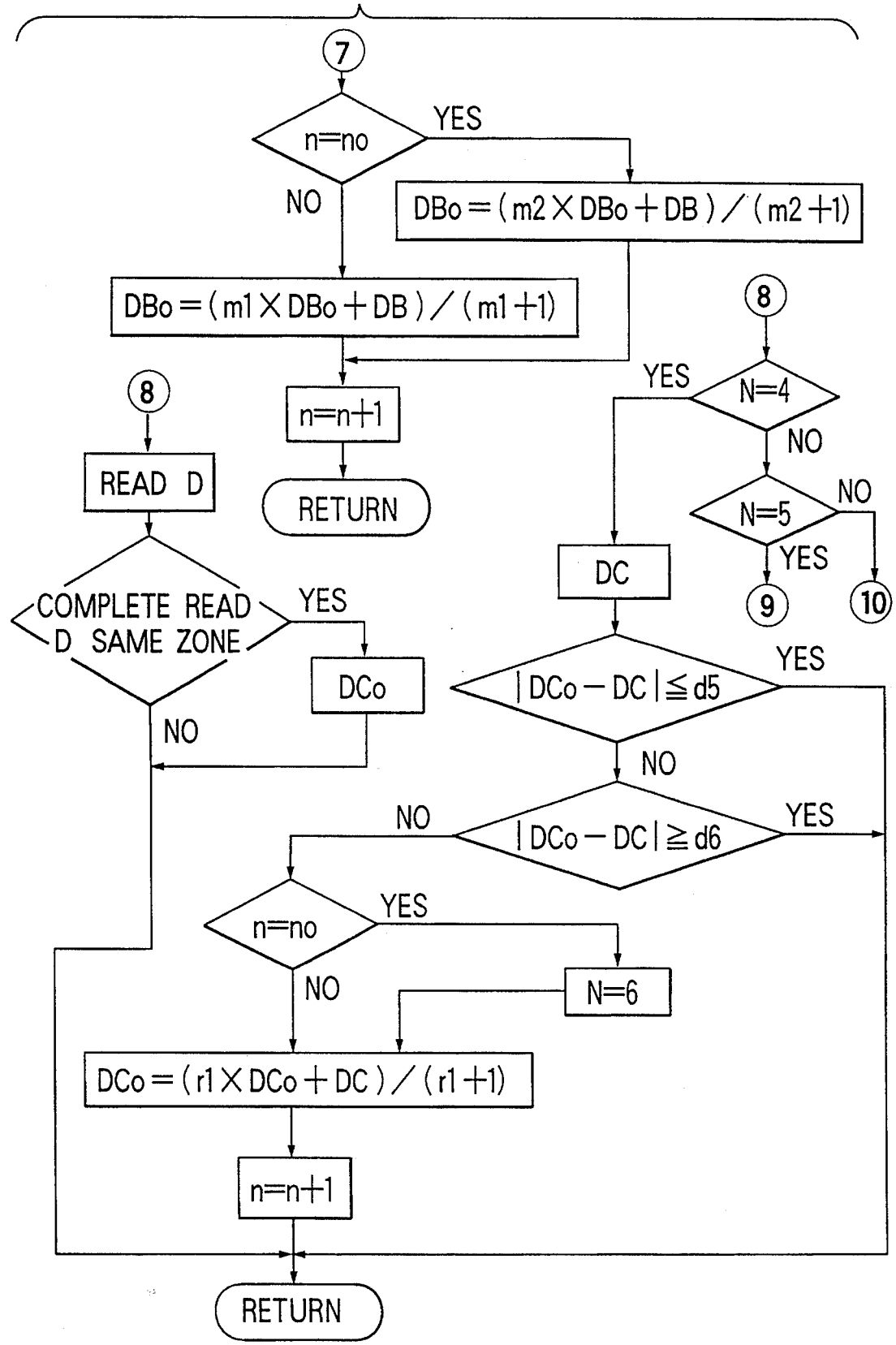
Figure 31:
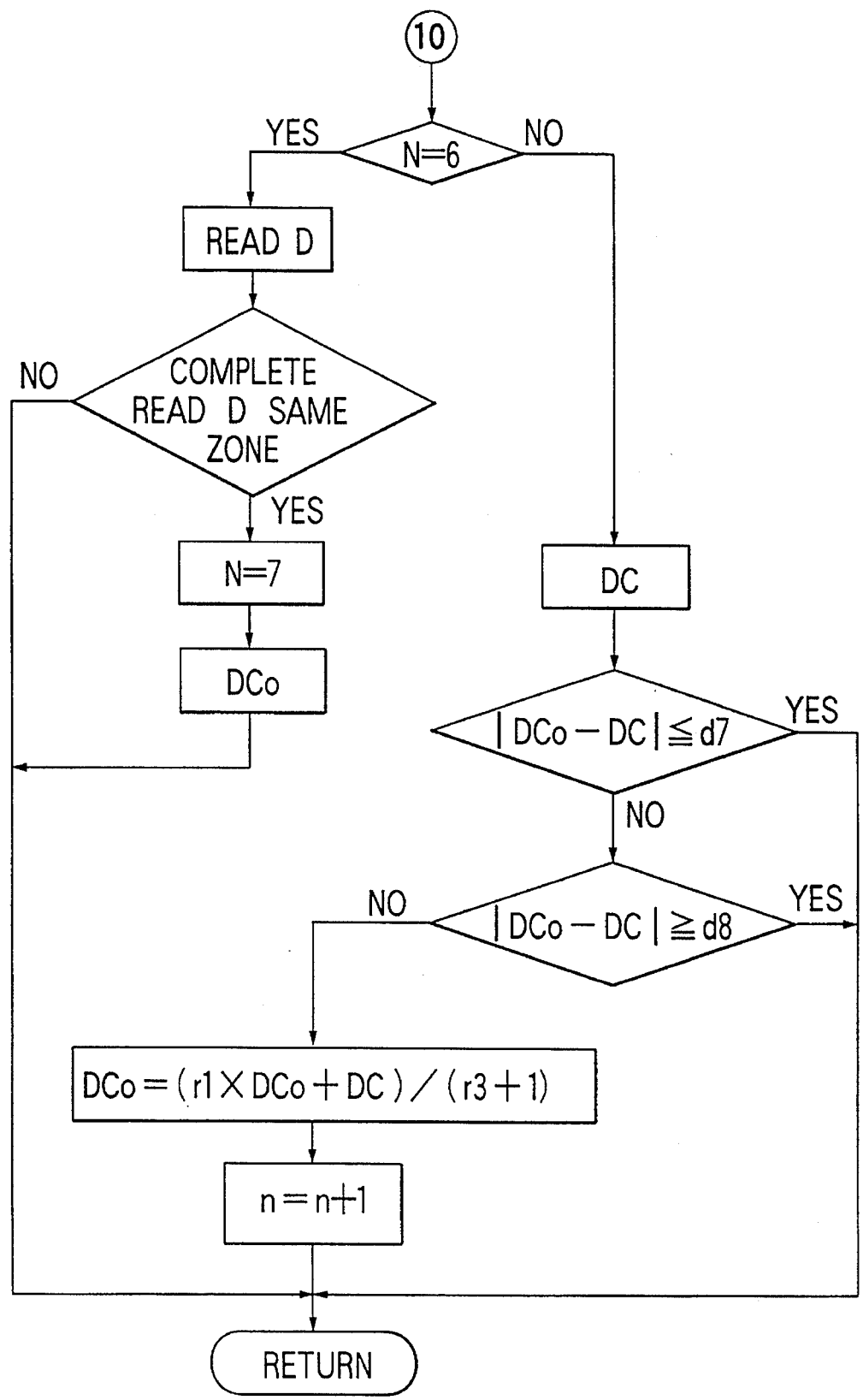
Figure 32:
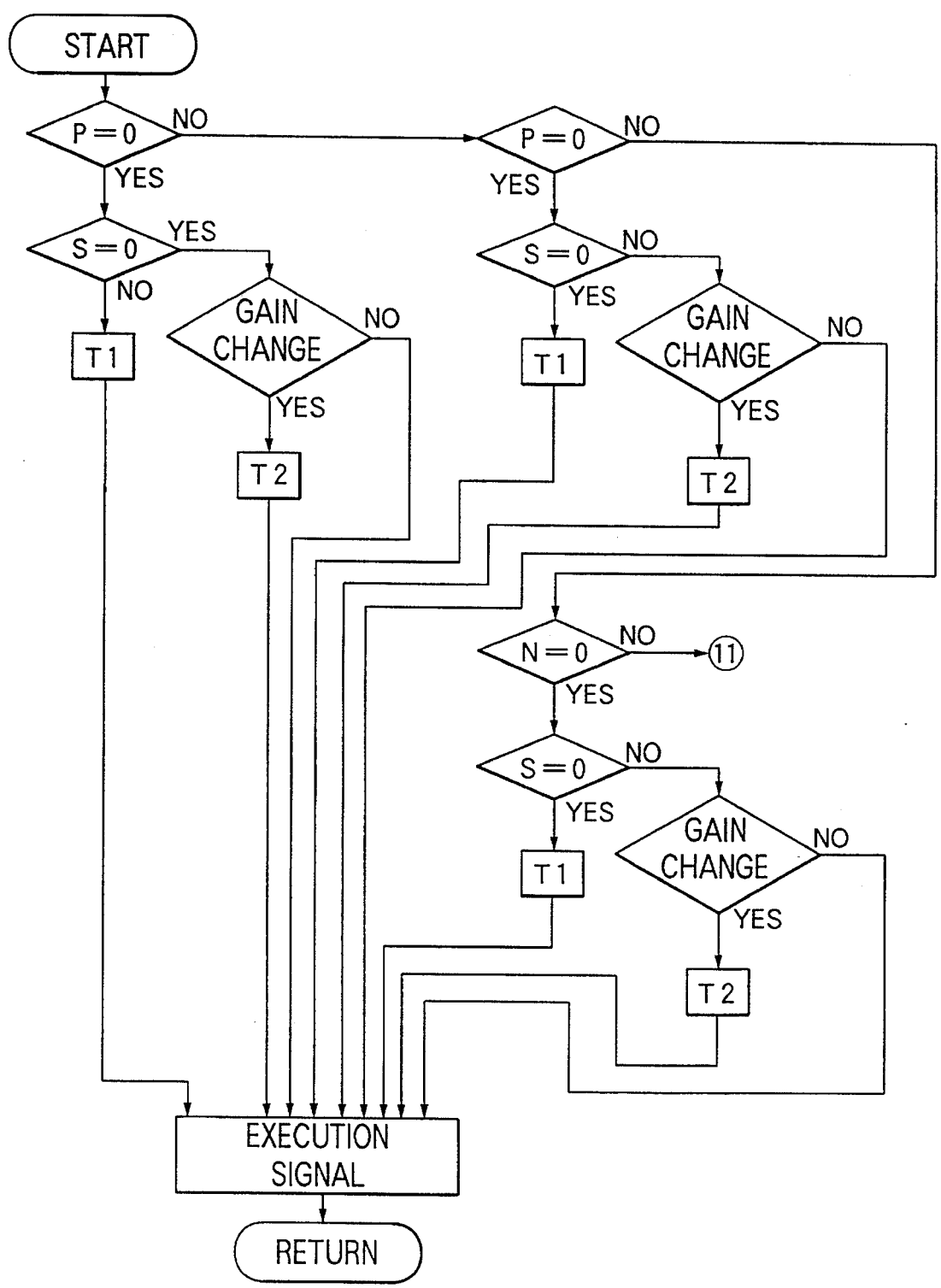
FIGS. 32, 33 and 34 are flow chart of a subroutine for execution of the learning control in accordance with another embodiment of the present invention.
Figure 33:
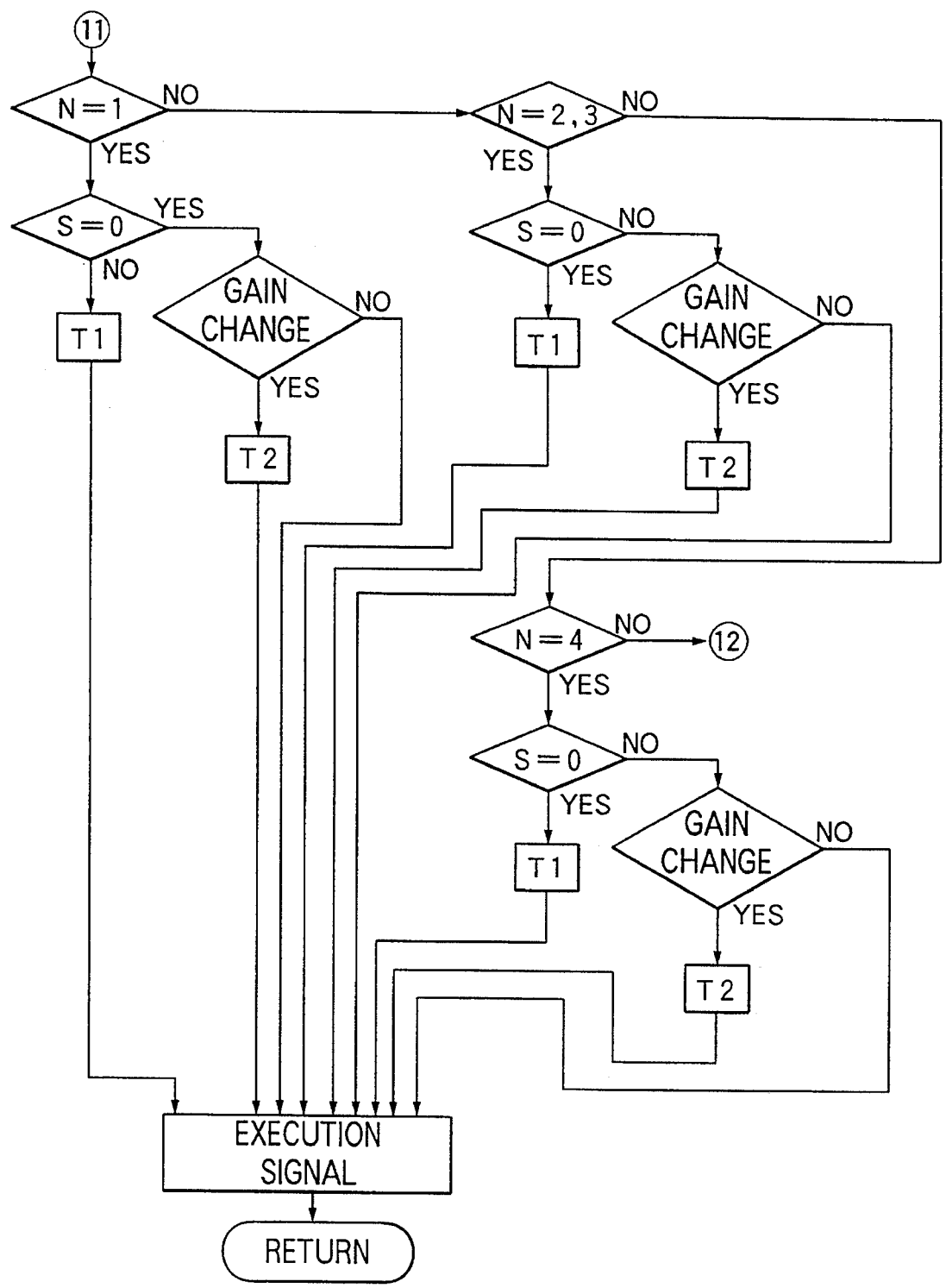
Figure 34:
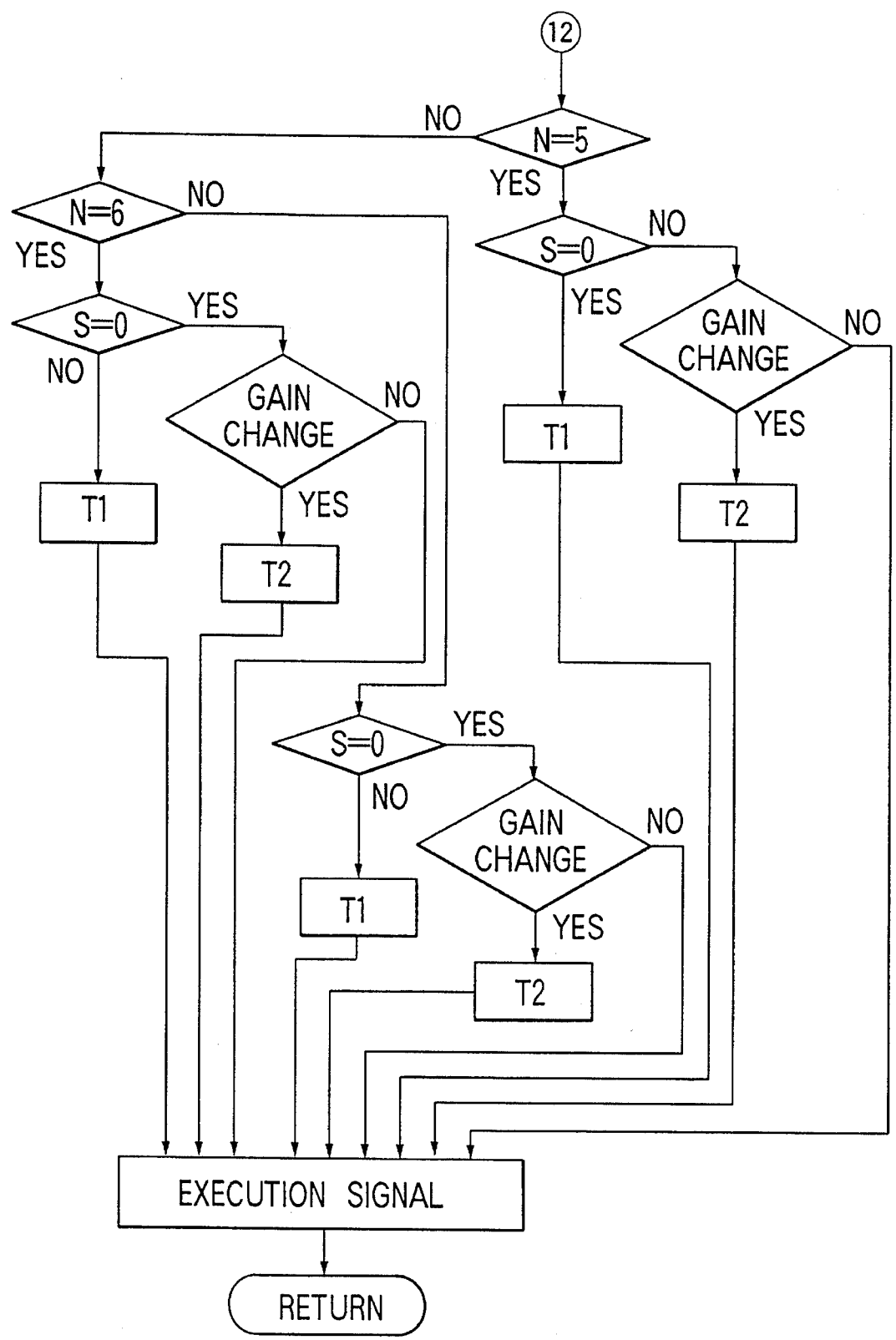

In still another embodiment, the compensation data x1 and x2 can be obtained through maps shown in FIGS. 27 and 28 which are provided a plurality of lines corresponding to the classified area.

Referring to FIGS. 29, 30, 31, 32, 33 and 34, flow charts in accordance with further learning control of the present invention are shown. According to the illustrated embodiment, if the number of the renewal times of the control gain reaches the value $n_0$, the size of the unit zone is reduced for getting more detailed information for that frequent drive situation. And the flag N is set at 6. The unit zone is reduced to 500 m distance with 50 m overlapped portion, or 5 minutes drive with 50 second drive overlapped portion. For the new defined unit zone, the learning control is initiated after the number which the running data D is read reaches the value of P. In this case, the flag N is set at 7. As the number of the renewal times of the control gain as a result of the compensation is increased, the unit zone for the sampling is reduced. In addition, as the number of the renewal of the control gain as a result of the compensation is increased, the hourly period for the sampling is reduced.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A learning control vehicle comprising:

running condition detecting means for detecting a running condition of a vehicle, running characteristic control means for controlling a control gain to change a running characteristic of the vehicle, gain control means for learning the running characteristic of the vehicle to change the control gain based on operation of the vehicle by a driver which is learned in a learning control program, location detecting means for detecting a location of the vehicle, and a driver identifying means for allowing the learning performed in said learning control program to change the control gain only when a specific driver is identified, the gain control means controlling the running characteristic control means in accordance with the learning control program based on a location signal which is produced by the location detecting means.

2. A learning control vehicle as recited in claim 1 further comprising first program memory means for storing a standard program which learns and changes the control gain in accordance with the driver's operation in a driving area classified in connection with the running condition of the vehicle, the gain control means controlling the running characteristic control means in accordance with the standard program based on a location signal which is produced by said location detecting means.

3. A learning control vehicle as recited in claim 1 and further comprising:

location detecting means for detecting a location of the vehicle, program memory means for storing a designated program, in which the control gain is provided according to a driving area in which the vehicle runs, and a standard program, in which the control gain is changed depending on the driving area and the operation of the vehicle by the driver and learned corresponding to each driver, the gain control means changing the control gain based on one of the designated and standard programs selected based on a signal from the driver identifying means.

4. A learning control vehicle comprising:

running condition detecting means for detecting a running condition of a vehicle, running characteristic control means for controlling a control gain to change a running characteristic of the vehicle, gain control means for learning the running characteristic of the vehicle to change the control gain based on operation of the vehicle by a driver which is learned in a learning control program, a driver identifying means for allowing the learning performed in said learning control program to change the control gain when a specific driver is identified, location detecting means for detecting a location of the vehicle, program memory means for storing a designated program, in which the control gain is provided according to a driving area in which the vehicle runs, and a standard program, in which the control gain is changed depending on the driving area and the operation of the vehicle by the driver and learned corresponding to each driver, the gain control means changing the control gain based on one of the designated and standard programs selected based on a signal from the driver identifying means, first program memory means for storing a standard program which learns and changes the control gain in accordance with the driver's operation in a driving area classified in connection with the running condition of the vehicle, the gain control means controlling the running characteristic control means in accordance with the standard program based on a location signal which is produced by said location detecting means, and second program memory means for storing a designated program which provides uniform control gain in accordance with a driving area classified in connection with the running condition of the vehicle, the gain control means controlling the running characteristic control means in accordance with the designated program based on a location signal which is produced by the location detecting means.

5. A learning control vehicle as recited claim 4 wherein the program memory means further stores a learning control program including a terrain learning program which learns the terrain within a specific area and an operation learning program which learns the driver's operation, the gain control means selecting the learning control program to change the control gain when the driver identifying means identifies the specific driver and when the location detecting means detects that the vehicle runs within a specific area.

6. A learning control vehicle as recited in claim 5 wherein when the vehicle runs within the specific area even when the driver is not the specific driver, the gain control means may select the terrain learning program of the learning control program.

7. A learning control vehicle as recited in claim 5 wherein the gain control means selects the designated program when the driver is not the specific driver or when the vehicle does not run in the specific area.

8. A learning control vehicle as recited in claim 4 wherein the driver identifying means identifies the specific driver based on features of the driver's operation.

9. A learning control vehicle as recited in claim 4 wherein the driver identifying means identifies the specific driver by a bodily feature.

10. A learning control vehicle as recited in claim 4 wherein the driver identifying means is provided with a manual input means for producing an identity signal when specific information about the driver is manually provided and identifies the specific driver when the identity signal is detected.

11. A learning control vehicle as recited in claim 4 wherein the driver identifying means identifies the specific driver by at least two articles belonging to the driver, the driver's operation and a bodily feature.

12. A learning control vehicle as recited in claim 4 wherein when the specific driver changes to another and vice versa, the gain control means changes the learning control program a predetermined time period after the change of the driver.

13. A learning control vehicle as recited in claim 4 wherein terrain learning control is carried out by selecting the standard program in which the control gain varies depending on the driver and a classified area where the vehicle runs or by selecting the designated program in which a constant control gain is allotted depending on the classified area.

14. A learning control vehicle as recited in claim 4 wherein the running characteristic of the vehicle is controlled by changing the control gain in accordance with classified areas which include a city area, an urban area, a suburban area, a mountain area, and a free way.

15. A learning control vehicle as recited in claim 4 wherein the running characteristic is controlled by changing the control gain in accordance with the operation of the vehicle by utilizing the standard program to match a frequent driver's personality.

16. A learning control vehicle as recited in claim 4 wherein the gain control means stops a learning control through the standard program and controls the running characteristic control means in accordance with the designated program under a specific running condition.

17. A learning control vehicle as recited in claim 16 wherein a program memory stores designated programs for a normal running condition of the vehicle and a stable running program for improving a running stability of the vehicle under the specific running condition.

18. A learning control vehicle as recited in claim 17 wherein when a lateral acceleration acting on the vehicle in a lateral direction is greater than a predetermined value, the gain control means stops the learning control and control the running characteristic control means in accordance with the stable running program.

19. A learning control vehicle as recited in claim 17 wherein when friction between a wheel and road surface on which the vehicle runs is lower than a predetermined value, the gain control means stops the learning control program and controls the running characteristic control means in accordance with the stable running program.

20. A learning control vehicle as recited in claim 17 wherein when the program is changed as the gain control means stops the learning control and controls the running characteristic control means in accordance with the stable running program, the gain control means controls the running characteristic control means to change the control gain gradually.

21. A learning control vehicle as recited in claim 4 wherein the location detecting means detects the location of the vehicle by a navigation system which provides the location of the vehicle automatically.

22. A learning control vehicle as recited in claim 4 wherein the location detecting means detects the location of the vehicle by a manual device through which the driver inputs the location of the vehicle manually.

23. A learning control vehicle comprising:

running condition detecting means for detecting a running condition of a vehicle, running characteristic control means for controlling a control gain to change a running characteristic of the vehicle, gain control means for learning the running characteristic of the vehicle to change the control gain based on operation of the vehicle by a driver which is learned in a learning control program, and a driver identifying means for allowing the learning performed in said learning control program to change the control gain when a specific driver is identified, wherein the gain control means controls the running characteristic control means to change the control gain in accordance with a learning program which learns the specific driver's operation in a specific area which is defined as an area within a predetermined distance from a base point and in accordance with a standard program which learns and changes the control gain in accordance with the specific driver's operation in a driving area classified in connection with the running condition of the vehicle when the specific driver drives the vehicle outside of the specific area.

24. A learning control vehicle as recited in claim 23 wherein the gain control means controls the running characteristic to change the control gain in accordance with one of the learning and standard programs.

25. A learning control vehicle as recited in claim 23 wherein the learning program is produced as the gain control means learns the terrain and the driver's operation within the specific area.

26. A learning control vehicle as recited in claim 25 wherein the gain control means learns the driver's operation in a predetermined hourly period of a day in the specific area to produce the learning program.

27. A learning control vehicle as recited in claim 25 wherein the gain control means controls the running characteristic control means to change the control gain in accordance with the standard program before the learning program is produced.

28. A learning control vehicle as recited in claim 25 wherein the gain control means learns the driver's operation in a unit zone defined in the specific area.

29. A learning control vehicle as recited in claim 28 wherein the unit zone is provided as a predetermined distance in the specific area, adjacent unit zones including an overlapped portion of a certain distance.

30. A learning control vehicle as recited in claim 28 wherein the unit zone is provided as a predetermined running time period in the specific area, adjacent unit zones including an overlapped portion of a certain running time of the vehicle.

31. A learning control vehicle as recited in claim 25 wherein the gain control means learns a terrain in a unit zone defined in the specific area.

32. A learning control vehicle comprising:

running condition detecting means for detecting a running condition of a vehicle, running characteristic control means for controlling a control gain to change a running characteristic of the vehicle, gain control means for learning the running characteristic of the vehicle to change the control gain based on operation of the vehicle by a driver which is learned in a learning control program, and a driver identifying means for allowing the learning performed in said learning control program to change the control gain when a specific driver is identified, wherein the gain control means controls the running characteristic control means to change the control gain in accordance with a learning program which learns the driver's operation in a specific area determined by said location detecting means which is defined as an area within a predetermined distance from a base point.

33. A learning control vehicle as recited in claim 32 and further comprising location detecting means for detecting a location at which the vehicle runs, the gain control means suspending the learning control program when the gain control means does not receive a location signal from the location detecting means.

34. A learning control vehicle as recited in claim 32 and further comprising location detecting means for detecting a location at which the vehicle runs, the gain control means controlling the running characteristic control means in accordance with the designated program when the gain control means holds that a location signal from the location detecting means indicates that the vehicle is not running in the specific area.

35. A learning control vehicle as recited in claim 32 and further comprising location detecting means for detecting a location at which the vehicle runs, the gain control means controlling the running characteristic control means in accordance with the standard program when the gain control means holds that a location signal from the location detecting means indicates that the vehicle is not running in the specific area.

36. A learning control vehicle as recited in claim 32 and further comprising location detecting means for detecting a location at which the vehicle runs, the gain control means controls the running characteristic control means to learn and compensate the control gain based on the location of the vehicle, compensation of the control gain being changed in accordance with the number of control gain compensations.

37. A learning control vehicle as recited in claim 36 wherein the gain control means samples running data in the same hourly period in the same unit zone in the specific area and compensates the control gain based on the sampled running data in accordance with a learning control.

38. A learning control vehicle as recited in claim 37 wherein as the number of the renewal of the control gain as a result of the compensation is increased, the unit zone for the sampling is reduced.

39. A learning control vehicle as recited in claim 37 wherein as the number of the renewal of the control gain as a result of the compensation is increased, the hourly period for the sampling is reduced.

40. A learning control vehicle as recited in claim 36 wherein the gain control means compensates and renews the control gain by a learning control when the vehicle runs in the same area.

41. A learning control vehicle as recited in claim 36 wherein the compensation for the control gain is reduced when the driver's operation does not change substantially in view of statistic data in spite of an increase of the number of the renewal of the control gain.

42. A learning control vehicle as recited in claim 41 wherein the control gain is reduced when the operation of the acceleration pedal is not changed statistically and substantially in spite of an increase of the number of the renewal of the control gain.

43. A learning control vehicle as recited in claim 41 wherein the control gain is reduced when the operation of a shift lever is not changed statistically and substantially in spite of an increase of the number of the renewal of the control gain.

44. A learning control vehicle as recited in claim 41 wherein the control gain is reduced when the operation of a steering wheel is not changed statistically and substantially in spite of an increase of the number of the renewal of the control gain.

45. A learning control vehicle as recited in claim 36 wherein the control gain is compensated so as to improve the running stability of the vehicle when the driver's operation does not change substantially in view of statistic data in spite of an increase of the number of the renewal of the control gain.

46. A learning control vehicle as recited in claim 36 wherein the control gain is compensated to a predetermined value when the driver's operation does not change substantially in view of statistic data in spite of an increase of the number of the renewal of the control gain.

47. A learning control vehicle as recited in claim 36 wherein the control gain is temporarily increased when the driver's operation does not change statistically and substantially in spite of an increase of the number of the renewal of the control gain, and then the control gain is reduced eventually if the driver's operation does not change irrespective of the temporary increase of the control gain.

48. A learning control vehicle as recited in claim 47 wherein the control gain is reduced gradually after the temporary increase thereof.

49. A learning control vehicle as recited in claim 36 wherein the control gain is temporarily increased when the driver's operation does not change statistically and substantially in spite of an increase of the number of the renewal of the control gain, and then the control gain is reduced eventually if the operation of an acceleration pedal does not change irrespective of the temporary increase of the control gain.

50. A learning control vehicle as recited in claim 36 wherein the control gain is temporarily increased when the driver's operation does not change statistically and substantially in spite of an increase of the number of the renewal of the control gain, and then the control gain is reduced eventually if the operation of a shift lever does not change irrespective of the temporary increase of the control gain.

51. A learning control vehicle as recited in claim 36 wherein the control gain is temporarily increased when the driver's operation does not change statistically and substantially in spite of an increase of the number of the renewal of the control gain, and then the control gain is reduced eventually if the operation of a steering wheel does not change irrespective of the temporary increase of the control gain.

52. A learning control vehicle as recited in claim 36 wherein the gain control means suspends the learning control when the driver's operation is substantially different from the driver's operation obtained through the learning control.

53. A learning control vehicle as recited in claim 4 wherein the driver identifying means identifies the driver by an article belonging to the driver.

* * * * *